(12) United States Patent
Pronovost

(10) Patent No.: US 12,065,140 B1
(45) Date of Patent: Aug. 20, 2024

(54) OBJECT TRAJECTORY DETERMINATION

(71) Applicant: Zoox, Inc., Foster City, CA (US)

(72) Inventor: Ethan Miller Pronovost, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 306 days.

(21) Appl. No.: 17/216,527

(22) Filed: Mar. 29, 2021

(51) Int. Cl.
*B60W 30/00* (2006.01)
*B60W 30/095* (2012.01)
*B60W 40/04* (2006.01)
*G06N 3/045* (2023.01)
*G06N 3/08* (2023.01)
*G06V 20/58* (2022.01)

(52) U.S. Cl.
CPC ........ *B60W 30/0956* (2013.01); *B60W 40/04* (2013.01); *G06N 3/045* (2023.01); *G06N 3/08* (2013.01); *G06V 20/58* (2022.01); *B60W 2554/4041* (2020.02); *B60W 2554/4044* (2020.02); *B60W 2554/4045* (2020.02); *B60W 2554/80* (2020.02)

(58) Field of Classification Search
CPC ............ B60W 30/0956; B60W 40/04; B60W 2554/4041; B60W 2554/4044; B60W 2554/4045; B60W 2554/80; G06N 3/045; G06N 3/08; G06V 20/58
See application file for complete search history.

(56) References Cited

U.S. PATENT DOCUMENTS

| | | | | |
|---|---|---|---|---|
| 10,421,453 B1* | 9/2019 | Ferguson | ........ | B60W 30/18154 |
| 10,852,721 B1* | 12/2020 | Smith | .................. | G05D 1/0022 |
| 11,562,181 B2* | 1/2023 | Chen | ................ | G06V 30/19173 |
| 2017/0206464 A1* | 7/2017 | Clayton | .................. | G06N 3/044 |
| 2018/0018524 A1* | 1/2018 | Yao | .......................... | G06V 20/56 |
| 2018/0060701 A1* | 3/2018 | Krishnamurthy | ...... | G06N 3/045 |
| 2018/0136000 A1* | 5/2018 | Rasmusson, Jr. | ..... | G05D 1/0212 |
| 2019/0049987 A1* | 2/2019 | Djuric | ...................... | G06N 3/08 |
| 2019/0064840 A1* | 2/2019 | Becker | ................ | G05D 1/0248 |
| 2019/0129831 A1* | 5/2019 | Goldberg | ............ | G06F 3/04847 |
| 2019/0156128 A1* | 5/2019 | Zhang | ..................... | G08G 1/167 |
| 2019/0234751 A1* | 8/2019 | Takhirov | ............ | G01C 21/3461 |
| 2020/0004259 A1* | 1/2020 | Gulino | ................... | G05D 1/024 |
| 2020/0026282 A1* | 1/2020 | Choe | ........................ | G06T 7/50 |

(Continued)

OTHER PUBLICATIONS

Office Action for U.S. Appl. No. 17/216,545, mailed on Apr. 19, 2023, Pronovost, "Graph Generation by a Generative Adversarial Network", 19 Pages.

*Primary Examiner* — Peter D Nolan
*Assistant Examiner* — Peter Y Ning
(74) *Attorney, Agent, or Firm* — Lee & Hayes, P.C.

(57) ABSTRACT

Techniques predicting object trajectories and metadata are described herein. For example, the techniques may include inputting data representing a top-down view of an environment into a machine learned model. In some examples, the top-down view can include rasterized data or vectorized data. The machine learned model may output trajectories (e.g., position data, velocity data, acceleration data, etc.) and metadata (e.g., yaw, object state data, etc.) of one or more objects in the environment indicating future positions of the object(s). The machine learned model may rank the output trajectories and send information about the ranked output trajectories to a vehicle computing device for consideration during vehicle planning including simulation.

20 Claims, 8 Drawing Sheets

(56) References Cited

U.S. PATENT DOCUMENTS

| | | | |
|---|---|---|---|
| 2020/0134494 A1 | 4/2020 | Venkatadri | |
| 2020/0150665 A1* | 5/2020 | Refaat | G05D 1/0088 |
| 2020/0159225 A1* | 5/2020 | Zeng | G05D 1/0212 |
| 2020/0174481 A1* | 6/2020 | Van Heukelom | G06N 3/045 |
| 2020/0191914 A1* | 6/2020 | Kunz | G05D 1/0088 |
| 2020/0202145 A1* | 6/2020 | Mao | G05D 1/0088 |
| 2020/0207375 A1* | 7/2020 | Mehta | B60W 60/00274 |
| 2020/0324795 A1* | 10/2020 | Bojarski | G01C 21/3602 |
| 2021/0009119 A1* | 1/2021 | Nattermann | B60W 30/0953 |
| 2021/0009163 A1* | 1/2021 | Urtasun | G08G 1/20 |
| 2021/0081715 A1* | 3/2021 | Rosman | B60W 50/06 |
| 2021/0150752 A1* | 5/2021 | Ayvaci | G06V 20/58 |
| 2021/0197813 A1* | 7/2021 | Houston | B60W 30/143 |
| 2021/0295171 A1* | 9/2021 | Kamenev | G06T 7/70 |
| 2021/0326651 A1* | 10/2021 | Northcutt | G06V 10/7747 |
| 2021/0406559 A1* | 12/2021 | Efland | G06V 10/803 |
| 2022/0153309 A1 | 5/2022 | Cui et al. | |
| 2022/0153314 A1 | 5/2022 | Suo et al. | |
| 2022/0169278 A1* | 6/2022 | Refaat | B60W 60/0011 |

* cited by examiner

OBJECT TRAJECTORY DETERMINATION

BACKGROUND

Machine learned models can be employed to predict an action for a variety of robotic devices. For instance, planning systems in autonomous and semi-autonomous vehicles determine actions for a vehicle to take in an operating environment. Actions for a vehicle may be determined based in part on avoiding objects present in the environment. For example, an action may be generated to yield to a pedestrian, to change a lane to avoid another vehicle in the road, or the like. Accurately predicting future object trajectories may be necessary to safely operate the vehicle in the vicinity of the object.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
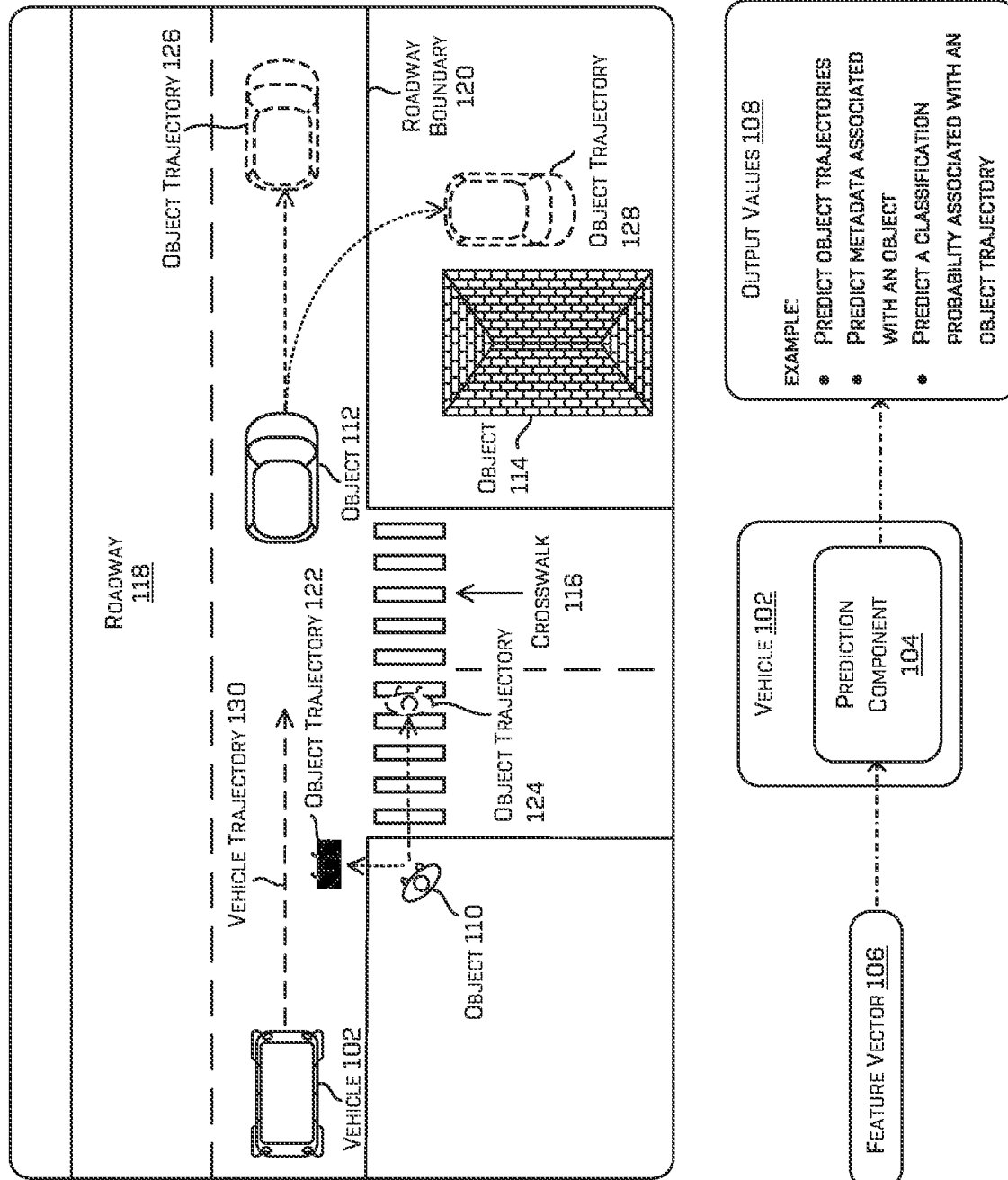
FIG. 1 is an illustration of an autonomous vehicle in an environment, in which an example machine learned model may process a feature vector of an environment and an object to predict object trajectories.

This application describes techniques for applying and/or training a model to predict trajectories of an object in an environment. In some examples, such object trajectories may be indicative of motion the object may take at some point in the near future. For example, one or more machine learned models may process data representations associated with an object and an environment, and determine potential positions of the object at a future time. In some examples, the object may be a vehicle and the model(s) may predict trajectories for the vehicle and metadata associated with the vehicle. The metadata may indicate whether the vehicle is using a turn signal, obeying traffic laws, and so on. The model(s) may also or instead output an indication of which of multiple object trajectories that the object is most likely to follow. In at least some examples, object trajectories and metadata determined by the model(s) may be considered during vehicle planning thereby improving vehicle safety as a vehicle navigates in the environment by planning for the possibility that an object may use different trajectories to arrive at several possible destinations.

In some examples, a computing device may implement a machine learned model to predict a future position for an object (e.g., a bicycle, a pedestrian, another vehicle, an animal, etc.) that may result in an impact to operation of an autonomous vehicle. For instance, the machine learned model may determine a trajectory (e.g., direction, speed, and/or acceleration) for an object to follow in an environment at a future time and attributes about the object at the future time. In such an example, a vehicle computer system of the autonomous vehicle may predict a candidate trajectory for the vehicle (using a same or different model) with consideration to an output (e.g., the trajectory and the metadata) from the machine learned model thereby improving vehicle safety by providing the autonomous vehicle with a candidate trajectory that is capable of safely avoiding the potential future positions of the object that may impact operation of the vehicle (e.g., intersect a trajectory of the autonomous vehicle, cause the autonomous vehicle to swerve or brake hard, etc.).

The vehicle may comprise a vehicle computing device to detect objects using one or more sensors while navigating in the environment. The objects may include static objects (e.g., buildings, bridges, signs, etc.) and dynamic objects such as other vehicles (e.g., cars, trucks, motorcycles, mopeds, etc.), pedestrians, bicyclists, or the like. In some examples, the objects may be detected based on sensor data from sensors (e.g., cameras, motion detectors, lidar sensors, radar sensors, etc.) of the vehicle. Sensor data representing the detected objects may be input into the models to predict behavior (e.g., one or more predicted trajectories, locations, speeds, poses, and so on) of objects in the environment.

In some examples, a computing device can receive sensor data as input and determine data indicative of a top-down representation of an environment and an object in the environment. The data can comprise rasterized image data or vectorized data, and may be input into a machine learned model (also referred to as "the model") that outputs a feature vector associated with the object. The feature vector may be generated to represent a current state of the object (e.g., a heading, a speed, etc.) and/or a behavior of the object over time (e.g., a change in yaw, speed, or acceleration of the object). In some examples, the model (e.g., a convolutional neural network) determines additional feature vectors to represent other objects and/or features of the environment.

In various examples, the feature vector(s) generated by the model (e.g., a first model), can be input into a second machine learned model which also receives and/or determines candidate locations of the object(s). For example, the second model may be a multi-layer perceptron that is configured to output predicted trajectories for the object based at least in part on the feature vector and the candidate location(s). The second model may also output a classification probability associated with the predicted trajectory (e.g., a likelihood that the object follows the predicted trajectory), and metadata associated with the object. The metadata can be indicative of an attribute of the object (e.g. a predicted yaw over a time period). In some examples, the outputs from the second model can be sent to a vehicle computing device of a vehicle in the environment to enable the vehicle computing device to determine a trajectory for the vehicle based at least in part on the outputs.

In various examples, a machine learned model can receive and/or determine vector representations, or vectorized data, to represent current and future positions of objects in an environment. The model may determine candidate locations for an object in the environment based on a proximity of an object to a roadway centerline and/or by outputting a grid with grid points that represent candidate locations. For instance, the grid may be output by the model to determine future locations of an object responsive to detecting that the object is exhibiting abnormal behavior (e.g., relative to another object of a same object type) and/or in the absence of road information. In various examples, one or more of: a size of the grid, a position of the grid, or a number of grid points may be based at least in part on an object type associated with the object (e.g., dynamics associated with the object type). By generating a grid as described herein, the model can improve candidate location determinations particularly in areas of the environment that lack a road, a crosswalk, and so on. Further, by employing a grid as described herein, an amount of memory and/or processing resources required to determine candidate locations can be reduced versus not employing the grid. For example, a grid may discretize an environment and/or limit a search space relative to a continuous search space or an unbounded search space.

In some examples, a model (e.g., a convolutional neural network) may define an algorithm for use in predicting trajectories and metadata associated with an object. In some examples, a model to predict object trajectories may include one or more machine learned algorithm(s) to identify, detect, and/or classify attributes of a detected object. In some examples, the model may include one or more classifiers. A classifier can be representative of a decision tree, a Neural Network, a Naïve Bayes classifier, and/or other algorithm(s) that perform classification. In some examples, a classifier may represent a function that assigns a class or label to an object, targets an object in an environment, and/or categorizes an object. In some examples, a classifier can be used with a machine learning technique to train a model to perform a function (e.g., determine trajectories of an object, etc.). For instance, the model may output a classification for whether the object follows a predicted trajectory (e.g., Y/N).

In some examples, the machine learned model may predict several different trajectories for an object associated with different possible destinations. By way of example and not limitation, in a case where a vehicle is approaching an intersection, an autonomous vehicle may implement a machine learned model to output: a first trajectory for the vehicle to arrive at a first location, a second trajectory for the vehicle to arrive at a second location, as well as metadata about the vehicle (e.g., the vehicle is using a turn signal and slowing down over time). In such examples, the machine learned model may receive, as input, vector representations of a top-down view of the environment and the vehicle in the environment. The model may predict a trajectory and metadata for the vehicle based at least in part on a combination of the vector representations. Representing objects and features of the environment using vectors is further discussed in FIG. 2, and elsewhere.

In some examples, a machine learned model may receive a vector representation of data compiled into an image format representing a top-down view of an environment. The top-down view may be determined based at least in part on map data and/or sensor data captured from or associated with a sensor of an autonomous vehicle in the environment. The vector representation of the top-down view can represent one or more of: an attribute (e.g., position, velocity, acceleration, yaw, etc.) of an object, history of the object (e.g., location history, velocity history, etc.), an attribute of the vehicle (e.g., velocity, position, etc.), crosswalk permission, traffic light permission, and the like. The data can be represented in a top-down view of the environment to capture context of the autonomous vehicle (e.g., identify actions of other vehicles and pedestrians relative to the vehicle). The top-down view of the environment may also represent a direction and/or a destination that a vehicle or other object may be associated with (e.g., facing and/or moving towards) by providing more information about surroundings of the vehicle such as whether the vehicle is located near a driveway adjacent a building.

In some examples, a machine learned model may receive a vector representation of data associated with one or more objects in the environment. For instance, the machine learned model can receive (or in some examples determine) one or more vectors representing one or more of: position data, orientation data, heading data, velocity data, speed data, acceleration data, yaw rate data, or turning rate data associated with the object. A first end of a vector can represent a first time and a first location, and the other end of the vector can represent a second time and assuming motion by the object, a second location. Additional details regarding vector representations can be found in FIG. 2, and elsewhere.

In various examples, the machine learned model can determine that an object is behaving abnormally relative to other objects of a same type (e.g., vehicles or pedestrians violating traffic laws, moving erratically, etc.). For example, a same or different machine learned model can determine an object type associated with one or more objects in the environment, and determine, based at least in part on the object type, a grid location relative to the object, and output a grid at the grid location. In such examples, the model can determine the object trajectories based at least in part on the grid. In some examples, the model can determine the grid based at least in part on the object being within a threshold distance from the roadway. Additional details regarding using grids to determine object trajectories can be found in FIG. 3, and elsewhere.

In various examples, a vehicle computing device may receive one or more instructions representative of output(s) from one or more models. The vehicle computing device may, for instance, send an instruction from the one or more instructions to a planning component of the vehicle that plans a trajectory for the vehicle and/or to a perception component of the vehicle that processes sensor data. Additionally or alternatively, output(s) from one or more models may be used by one or more computing devices remote from the vehicle computing device for training a machine learned model.

In various examples, the vehicle computing device may be configured to determine actions to take while operating (e.g., trajectories to use to control the vehicle) based on predicted object trajectories and/or metadata determined by one or more models. The actions may include a reference action (e.g., one of a group of maneuvers the vehicle is configured to perform in reaction to a dynamic operating environment) such as a right lane change, a left lane change, staying in a lane, going around an obstacle (e.g., double-parked vehicle, a group of pedestrians, etc.), or the like. The actions may additionally include sub-actions, such as speed variations (e.g., maintain velocity, accelerate, decelerate, etc.), positional variations (e.g., changing a position in a lane), or the like. For example, an action may include staying in a lane (action) and adjusting a position of the vehicle in the lane from a centered position to operating on a left side of the lane (sub-action).

For each applicable action and sub-action, the vehicle computing system may implement different models and/or components to simulate future states (e.g., estimated states) by projecting an autonomous vehicle and relevant object(s) forward in the environment for the period of time (e.g., 5 seconds, 8 seconds, 12 seconds, etc.). The models may project the object(s) (e.g., estimate future positions of the object(s)) forward based on a predicted trajectory associated therewith. For instance, the models may predict a trajectory of a vehicle and predict attributes about the vehicle (e.g., the vehicle is slowing down and using a turn signal, etc.) including whether the trajectory will be used by vehicle to arrive at a predicted location in the future. The vehicle computing device may project the vehicle (e.g., estimate future positions of the vehicle) forward based on the vehicle trajectories output by the model. The estimated state(s) may represent an estimated position (e.g., estimated location) of the autonomous vehicle and an estimated position of the relevant object(s) at a time in the future. In some examples, the vehicle computing device may determine relative data between the autonomous vehicle and the object(s) in the estimated state(s). In such examples, the relative data may include distances, locations, speeds, directions of travel, and/or other factors between the autonomous vehicle and the object. In various examples, the vehicle computing device may determine estimated states at a pre-determined rate (e.g., 10 Hertz, 20 Hertz, 50 Hertz, etc.). In at least one example, the estimated states may be performed at a rate of 10 Hertz (e.g., 80 estimated intents over an 8 second period of time).

In various examples, the vehicle computing system may store sensor data associated with an actual location of an object at the end of the set of estimated states (e.g., end of the period of time) and use this data as training data to train one or more models. For example, stored sensor data may be retrieved by a model and be used as input data to identify cues of an object (e.g., identify a feature, an attribute, or a pose of the object). Such training data may be determined based on manual annotation and/or by determining a change associated semantic information of the position of the object. Further, detected positions over such a period of time associated with the object may be used to determine a ground truth trajectory to associate with the object. In some examples, the vehicle computing device may provide the data to a remote computing device (i.e., computing device separate from vehicle computing device) for data analysis. In such examples, the remote computing device may analyze the sensor data to determine one or more labels for images, an actual location, yaw, speed, acceleration, direction of travel, or the like of the object at the end of the set of estimated states. In some such examples, ground truth data associated with one or more of: positions, trajectories, accelerations, directions, and so may be determined (either hand labelled or determined by another machine learned model) and such ground truth data may be used to determine an actual intent of the pedestrian (e.g., did the vehicle turn into a driveway, turn at an intersection, slow down near crosswalks, etc.). In some examples, corresponding data may be input into the model to determine an output (e.g., a trajectory, metadata, and so on) and a difference between the determined output, and the actual action by the object may be used to train the model.

The machine learned model may be configured to determine an initial position of each object in an environment (e.g., a physical area in which a vehicle operates and/or a simulated environment) indicated the sensor data. Each determined trajectory may represent a potential direction, speed, and acceleration that the object may travel through the environment. The object trajectories predicted by the models described herein may be based on passive prediction (e.g., independent of an action the vehicle and/or another object takes in the environment, substantially no reaction to the action of the vehicle and/or other objects, etc.), active prediction (e.g., based on a reaction to an action of the vehicle and/or another object in the environment), or a combination thereof.

As described herein, models may be representative of machine learned models, statistical models, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

The techniques discussed herein may improve a functioning of a vehicle computing system in a number of ways. The vehicle computing system may determine an action for the autonomous vehicle to take based on a determined trajectory and/or metadata of the object represented by data. In some examples, using the trajectory prediction techniques described herein, a model may output object trajectories and associated probabilities that improve safe operation of the vehicle by accurately characterizing motion of the object with greater detail as compared to previous models.

The techniques discussed herein can also improve a functioning of a computing device in a number of additional ways. In some cases, representing the environment and the object(s) in the environment as a top-down view can represent a simplified representation of the environment for the purposes of generating prediction probability(ies) and/or selecting between candidate actions. In some cases, the top-down view representation can represent the environment without extracting particular features of the environment, which may simplify the generation of the prediction system and subsequent generation of at least one predicted trajectory and metadata (e.g., reduce an amount of memory and/or processing resources). In some cases, evaluating an output by a model(s) may allow an autonomous vehicle to generate more accurate and/or safer trajectories for the autonomous vehicle to traverse an environment. In at least some examples described herein, predictions based on top-down encodings of the environment in addition to object state data may minimize (improve) a spread of a probability distribution function associated with the object, yielding safer decision-making of the system. These and other improvements to the functioning of the computing device are discussed herein.

In some examples, the object trajectory determination techniques discussed herein may provide higher training accuracy without sacrificing training speed when compared to other training techniques not using such techniques. In addition, in some examples, the object trajectory determination techniques discussed herein may reduce training time by training in parallel and/or improve accuracy by reducing an amount of data to be stored. Further, such techniques provide for training networks based on larger datasets than would otherwise not be enabled due to, for example, limitations of memory, processing power, etc. (thereby creating more robust learned networks in shorter amounts of time).

The methods, apparatuses, and systems described herein can be implemented in a number of ways. Example implementations are provided below with reference to the following figures. Although discussed in the context of an autonomous vehicle in some examples below, the methods, apparatuses, and systems described herein can be applied to a variety of systems. In one example, machine learned models may be utilized in driver-controlled vehicles in which such a system may provide an indication of whether it is safe to perform various maneuvers. In another example, the methods, apparatuses, and systems can be utilized in an aviation or nautical context. Additionally, or alternatively, the techniques described herein can be used with real data (e.g., captured using sensor(s)), simulated data (e.g., generated by a simulator), or any combination thereof.

FIG. 1 illustrates an autonomous vehicle (vehicle 102) in an example environment 100, in which an example machine learned model may process a feature vector of an environment and an object to predict object trajectories. As illustrated, the vehicle 102 includes a prediction component 104 that receives a feature vector(s) 106 associated with an environment and one or more objects, and determines output values 108 representing potential object trajectories, metadata associated with the object, and a classification probability associated with an object trajectory. In some examples, the prediction techniques described herein may be implemented at least partially by or in association with a vehicle computing device (e.g., vehicle computing device 502) and/or a remote computing device (e.g., computing device(s) 534).

In various examples, a vehicle computing device associated with the vehicle 102 may be configured to detect one or more objects (e.g., objects 110, 112, and 114) in the environment 100, such as via a perception component. In some examples, the vehicle computing device may detect the objects, based on sensor data received from one or more sensors. In some examples, the sensors may include sensors mounted on the vehicle 102, and include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like. In various examples, the vehicle 102 may be configured to transmit and/or receive data from other autonomous vehicles and/or the sensors. The data may include sensor data, such as data regarding the objects detected in the environment 100.

In various examples, the vehicle computing device can receive the sensor data and can semantically classify the detected objects (e.g., determine an object type), such as, for example, whether the object is a pedestrian, such as object 110, a vehicle such as object 112, a building such as object 114, a truck, a motorcycle, a moped, or the like. The objects may include static objects (e.g., buildings, bridges, signs, etc.) and dynamic objects such as other vehicles, pedestrians, bicyclists, or the like. In some examples, a classification may include another vehicle (e.g., a car, a pick-up truck, a semi-trailer truck, a tractor, a bus, a train, etc.), a pedestrian, a child, a bicyclist, a skateboarder, an equestrian, an animal, or the like. In various examples, the classification of the object may be used by a model to determine object characteristics (e.g., maximum speed, acceleration, maneuverability, etc.). In this way, potential trajectories by an object may be considered based on characteristics of the object (e.g., how the object may potentially move in the environment). As depicted in FIG. 1, the example environment 100 includes a crosswalk 116, a roadway 118, and a roadway boundary 120 defining an edge of the roadway.

Generally, the prediction component 104 provides functionality to determine an object trajectory 122 and an object trajectory 124 associated with the pedestrian 110, and determine an object trajectory 126 and an object trajectory 128 associated with the vehicle 112. The prediction component 104 can also predict metadata that describes an attribute of the object over time. For instance, the metadata may indicate that the vehicle 112 is using a turn signal, slowing down, approaching the roadway boundary 120, and/or behaving different than another vehicle of the same type.

In some examples, the prediction component 104 may be configured to receive and/or determine vector representations of one or more of a top-down view of the example environment 100, object state(s), and vehicle state(s). For example, the feature vector(s) 106 can comprise one or more vectors to represent features of the environment (e.g., a roadway, a crosswalk, a building, etc.), a current state of an object (e.g., the pedestrian 110 and/or the vehicle 112), and/or a current state of the vehicle 102. In other examples, the feature vector(s) 106 can represent a rasterized image based on top-down view data. Additional details about inputs to the prediction component 104 are discussed in FIG. 2, and elsewhere.

In some examples, the prediction component 104 provides functionality to determine a grid associated with one or more objects or regions in the environment. Grid points associated with the grid can represent candidate locations for the object(s) in the future. The candidate locations may be input int the prediction component along with the feature vector(s) 106. For instance, the prediction component can determine a grid location for the grid relative to the object based at least in part on an object type, and output the grid at the grid location. In such examples, the prediction component 104 can determine the object trajectories based at least in part on the grid.

In some examples, the prediction component 104 can determine and/or implement the grid based at least in part on the object being within a threshold distance from the roadway 118 or the roadway boundary 120. For instance, a grid may be output responsive to the vehicle 112 slowing down and/or moving towards the roadway boundary 120. Alternatively, a grid may be output for the pedestrian 110 based at least in part on the pedestrian 110 behaving unexpectedly relative to other pedestrians and/or moving away from the roadway 120 (e.g., to determine potential locations of the pedestrian in the absence of roadway information). In at least some examples, the grid may be used based on determining an intersection of a vehicle trajectory and a predicted object trajectory determined using a much less accurate or computationally intensive prediction. In additional or alternative instances, such a grid may be used where there is an initial prediction for the object to leave a mapped area (e.g., pulling off of a road and onto, for example, a driveway). Additional details regarding using a grid to determine object trajectories can be found in FIG. 3, and elsewhere.

In some examples, the prediction component 104 may process the feature vector(s) 106 (e.g., determined based on a rasterized top-down multi-channel image, a vector representation of an environment, and/or another representation of environmental context or scene context) to determine future locations and trajectories of the pedestrian 110 and the vehicle 112. In some examples, the prediction component 104 can rank the object trajectories 122, 124, 126, and 128 based at least in part on the predicted metadata. For instance, the object trajectory 128 may be ranked higher than the object trajectory 126 in examples when the metadata indicates that the vehicle 112 is slowing down, using a turn signal, or approaching a driveway. In other examples, the object trajectory 126 may be ranked higher (e.g., more likely to be used by the vehicle 112) than the object trajectory 128 in examples when the predicted metadata indicates that the vehicle 112 is following traffic laws (e.g., going the speed limit), not approaching the roadway boundary 120, and the like. In another example, the object trajectory 124 for the pedestrian 110 may be ranked higher than the object trajectory 122 based on a likelihood for a pedestrian to use the crosswalk 116.

In some examples, the prediction component 104 can rank the object trajectories 122, 124, 126, and 128 according to which is a closest object trajectory to the vehicle 102 and/or which object trajectory is most likely to be followed by the pedestrian 110 and/or the vehicle 112 (e.g., based on the classification probability associated with each object trajectory). In some examples, the prediction component 104 can determine a first probability that the pedestrian 110 follows the object trajectory 122 and a second probability that the pedestrian 110 follows the object trajectory 124, and so on for other objects in the environment 100.

The output values 108 from the prediction component 104 can be used by a vehicle computing device in a variety of ways. For instance, information about the object trajectories (or ranked object trajectories) and the metadata can be used by a planning component of the vehicle computing device to control the vehicle 102 in the environment 100 (e.g., determine a vehicle trajectory 130 and/or control a propulsion system, a braking system, or a steering system). The output values 108 may also or instead be used to perform a simulation by setting up conditions (e.g., an intersection, a number of objects, a likelihood for the object to exhibit abnormal behavior, etc.) for use during the simulation.

A training component of a remote computing device, such as the computing device(s) 534 (not shown) and/or the vehicle computing device (not shown) may be implemented to train the prediction component 104. Training data may include a wide variety of data, such as image data, video data, lidar data, radar data, audio data, other sensor data, etc., that is associated with a value (e.g., a desired classification, inference, prediction, etc.). Such values may generally be referred to as a "ground truth." To illustrate, the training data may be used for image classification and, as such, may include an image of an environment that is captured by an autonomous vehicle and that is associated with one or more classifications. In some examples, such a classification may be based on user input (e.g., user input indicating that the image depicts a specific type of object) or may be based on the output of another machine learned model. In some examples, such labeled classifications (or more generally, the labeled output associated with training data) may be referred to as ground truth.

Figure 2:
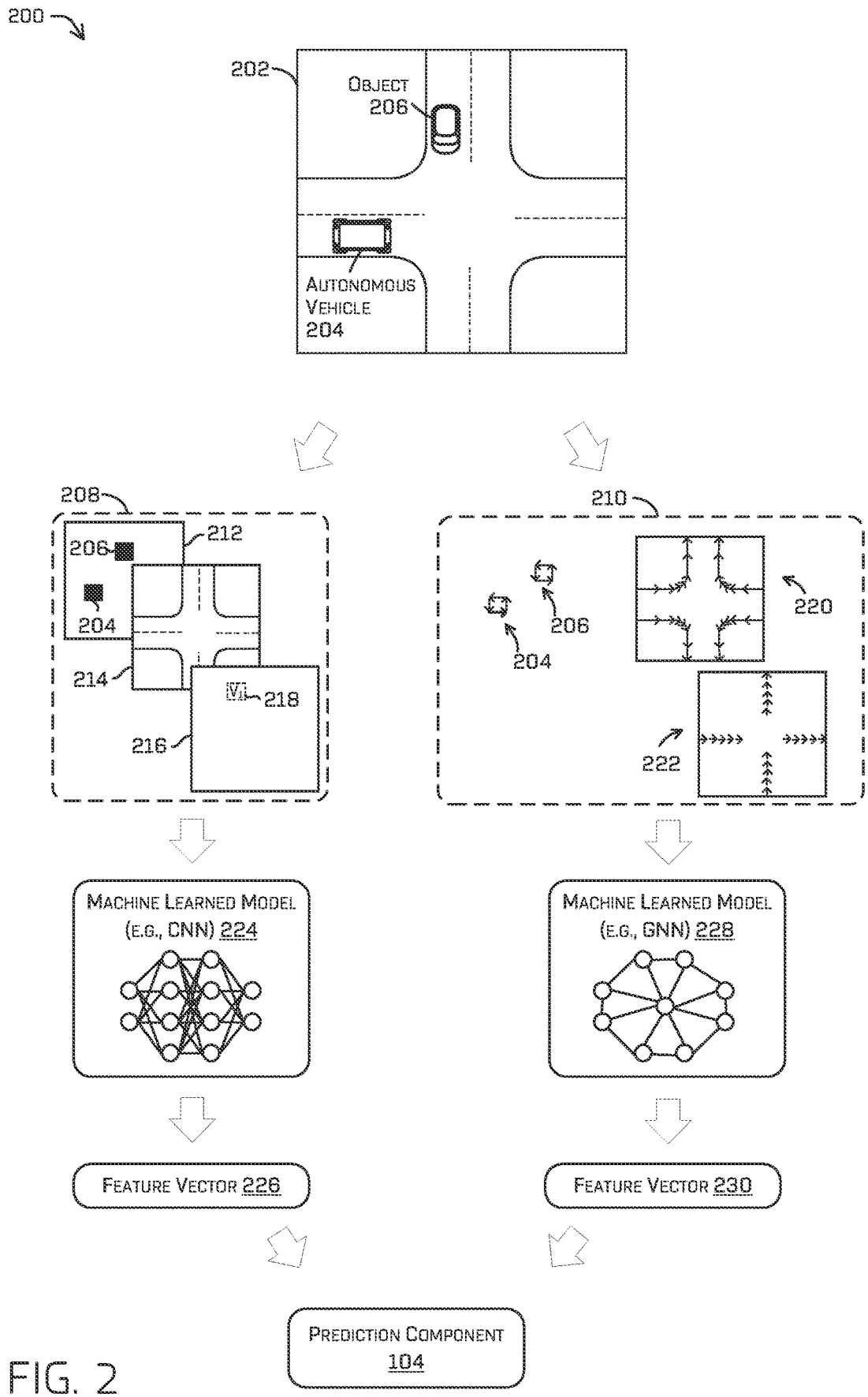
FIG. 2 is a block diagram of an example machine learned model implementing techniques to generate example vector representations as described herein.

FIG. 2 illustrates an example block diagram 200 of an example machine learned model implementing techniques to generate example vector representations as described herein. The example 200 includes a computing device that includes the prediction component in FIG. 1, however in other examples the techniques described in the example 200 may be performed by the vehicle computing device(s) 504 and/or the computing device(s) 534.

As illustrated, the computing device can receive and/or determine data associated with an environment 202 (or alternatively the example environment 100). For example, the computing device can receive data about objects in the environment from the perception component 522 and can receive data about the environment itself from the localization component 520, the perception component 522, and the one or more maps 528. By way of example and not limitation, the computing device may receive sensor data associated with an autonomous vehicle 204 and an object 206 and determine, based at least in part on the sensor data, data comprising a top-down representation 208 of the environment 202 and/or a vector representation 210 of the environment 202.

In some examples, the vector representation 210 can be determined by a graph neural network which is a type of neural network which operates on a graph structure. In various examples, the graph neural network may be partially connected or fully connected with separate edge features associated with distinct pairs of nodes in the graph neural network. Machine-learning based inference operations may be performed to update the state of the graph neural network, including updating nodes and/or edge features, based on internal inputs determined from the graph neural network itself and/or based on updated observations perceived by the autonomous vehicle in the environment. Updates to the graph neural network may represent predicted future states of the environment, and the autonomous vehicle may decode portions of the graph neural network to determine predictions for entity positions, velocities, trajectories, and/or other updated predicted states for the entities in the environment.

The vector representation 210 may, in some examples, be determined based on a polyline (e.g., a set of line segments) representing one or more map elements. For instance, the graph neural network can encode and aggregate the polyline into a node data structure representing with the map element(s). For example, an object or feature of the environment can be represented by polylines (e.g., a lane can be segmented into a number of smaller line segments whose length, location, orientation angle (e.g., yaw), and directionality, when aggregated, define the lane). Similarly, a crosswalk may be defined by four connected line segments, and a roadway edge or roadway centerline may be multiple connected line segments.

Each polyline in this example may include one or more points and/or line segments that can be represented as vectors. For instance, each line segment in a roadway, lane, or crosswalk, etc., may be defined by a position, length, orientation, directionality, and/or other attributes. The attributes associated with a line segment may be stored in a vector data structure representing the line segment, and each line segment in the polyline associated with the same map element may be encoded and aggregated into anode structure. In addition to the attributes associated with individual line segments of polyline (e.g., position, length, and orientation), additional attributes may be associated with the map element itself (e.g., map element type, directionality, permissibility, etc.). Additional details of graph neural networks are described in U.S. patent application Ser. No. 17/187,170, filed on Feb. 26, 2021, entitled "Graph Neural Network With Vectorized Object Representations in Autonomous Vehicle Systems," which is incorporated herein by reference in its entirety.

Generally, the top-down representation 208 can represent an area around the autonomous vehicle 204. In some examples, the area can be based at least in part on an area visible to sensors (e.g., a sensor range), a receding horizon, an area associated with an action (e.g., traversing through an intersection), and the like. In some examples, the top-down representation 208 may represent a 100 meter×100 meter area around the autonomous vehicle 204, although any area is contemplated. In various examples, the top-down representation 208 may be determined based at least in part on map data and/or sensor data captured from or associated with a sensor of the autonomous vehicle 204 in the environment 202.

In various examples, the top-down representation 208 of the environment 202 may be representative of a top-down perspective of the environment and may comprise one or more multi-channel image(s) such as a first channel 212, a second channel 214, and a third channel 216. The computing device can generate or determine the multi-channel image(s) to represent different attributes of the environment 202 with different channel images. For instance, an image having multiple channels, wherein each channel is representative of some information (semantic or otherwise). In some examples, one of the channel images 212, 214, and 216 can represent an object position, a feature of the environment, an object velocity 218, an object heading, an object acceleration, an object yaw, an attribute of the object, crosswalk permission (e.g., a crosswalk light or audio state), and traffic light permissibility (e.g., a traffic light state), just to name a few. In this way, the top-down representation 208 can represent objects in the environment (e.g., represented by a bounding box, as discussed herein), semantic information about the object (e.g., a classification type), movement information (e.g., velocity information, acceleration information, etc.), and the like. Additional details of using to-down representations are described in U.S. patent application Ser. No. 16/504,147, filed on Jul. 5, 2019, entitled "Prediction on Top-Down Scenes Based On Action Data," and in U.S. patent application Ser. No. 16/151,607, filed on Oct. 4, 2018, entitled "Trajectory Prediction on Top-Down Scenes," which are incorporated herein by reference in its entirety.

FIG. 2 shows that the environment 202 may also or instead be represented by the vector representation 210 comprising vectors to represent objects and/or features of the environment including one or more of: an attribute (e.g., position, velocity, acceleration, yaw, etc.) of the object 206, history of the object 206 (e.g., location history, velocity history, etc.), an attribute of the autonomous vehicle 204 (e.g., velocity, position, etc.), and/or features of the environment 202 (e.g., roadway boundary, roadway centerline, crosswalk permission, traffic light permission, and the like). For instance, the vector representation 210 can comprise vectors to represent features of the environment including roadway boundary vectors 220 and roadway centerline vectors 222.

In various examples, the example 200 can include the computing device generating the vector representation 210 based at least in part on state data associated with the autonomous vehicle 204 and/or the object 206. The state data can include data describing an object (e.g., the object 206 or the pedestrian 110, the vehicle 112 in FIG. 1) and/or a vehicle (e.g., vehicle 102) in an environment, such as in example environment 100. The state data can include, in various examples, one or more of position data, orientation data, heading data, velocity data, speed data, acceleration data, yaw rate data, or turning rate data associated with the object and/or the vehicle. In some examples, vectors associated with an environment, a vehicle state, and/or an object state may be combined as the vector representation 210 (e.g., vectors may be concatenated).

In some examples, the top-down representation 208 may be input into a machine learned model 224 (e.g., a convolutional neural network (CNN)), which can determine a feature vector 226 for input into a prediction component 104. Additionally or alternatively, the vector representation 210 may be input into a machine learned model (e.g., a graph neural network (GNN)) which can determine a feature vector 230 for input into the prediction component 104. The feature vector 226 can represent an association between the one or more channels of the top-down representation 208 while the feature vector 230 can represent an association between the vectors of the vector representation 210. The prediction component 104 can process the feature vector 226 and/or the feature vector 230 to determine the output values 108 indicative of predicted trajectories for the object 206, metadata for the object 206, and a classification probability for the trajectories.

Figure 3:
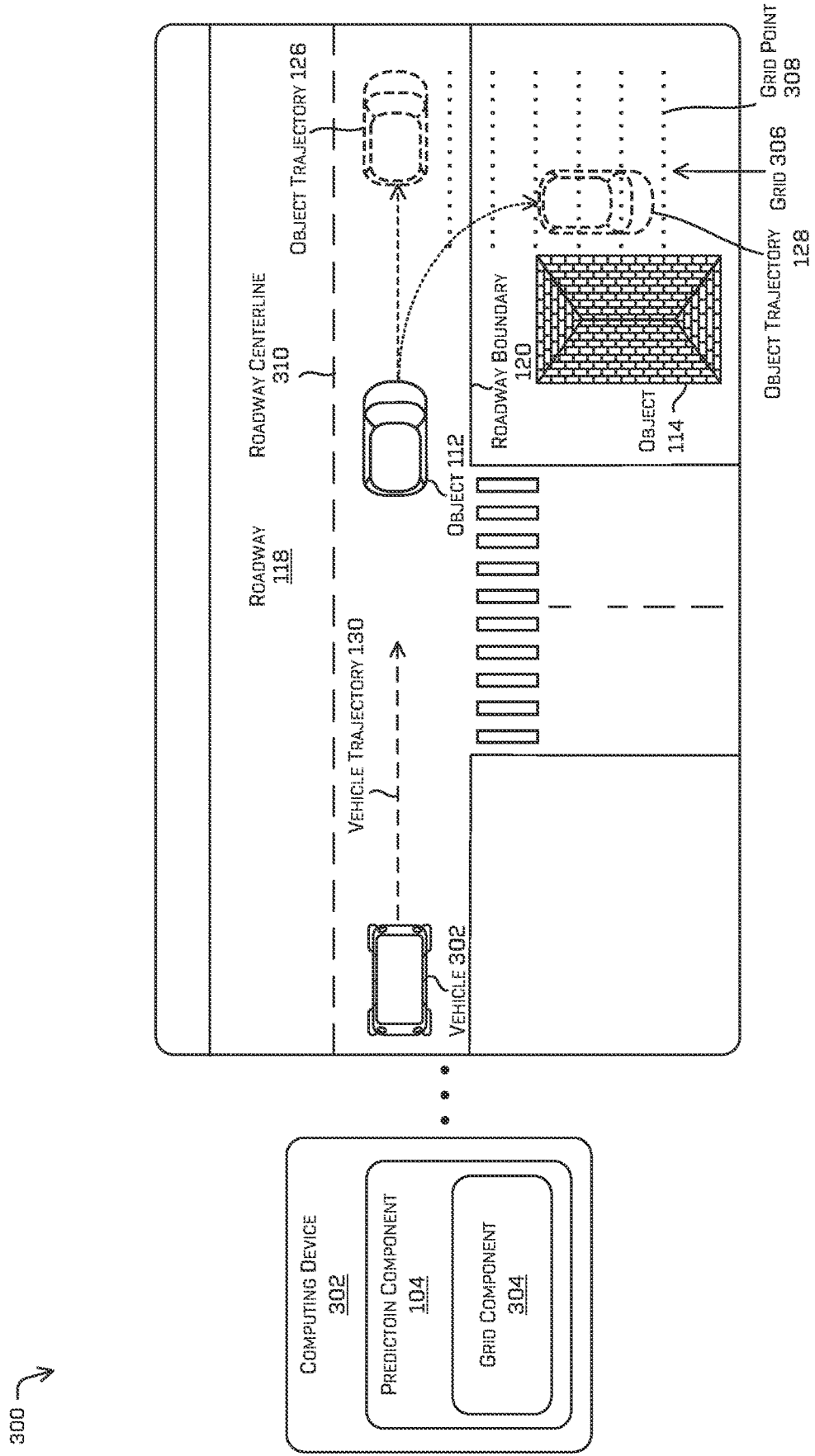
FIG. 3 is another block diagram of an example machine learned model implementing techniques to generate an example grid as described herein.

FIG. 3 illustrates an example block diagram 300 of an example machine learned model implementing techniques to generate an example grid as described herein. The example 300 includes a computing device 302 that includes the prediction component 104, however in other examples the techniques described in the example 300 may be performed by the vehicle computing device(s) 504 and/or the computing device(s) 534.

As depicted in FIG. 3, the prediction component 104 comprises a grid component 304 configured to generate a grid 306 comprising grid points 308 which represent candidate locations for an object. In some examples, the grid component 304 can generate the grid 304 to determine candidate location(s) for the vehicle 112. The grid points 308 represent different possible locations of the vehicle 112 at a future time. Candidate locations determined from the grid 306 can be used to determine trajectories for the vehicle 112 (e.g., trajectories 126 and/or 128).

In some examples, the grid component 304 can output the grid 306 based at least in part on the computing device 302 detecting that the vehicle 112 is behaving abnormally relative to other objects of a same type (e.g., the vehicle is moving erratically, changing speed relative to the flow of traffic, violating traffic laws, etc.). For example, when the object is a pedestrian, the grid 306 may be output based at least in part on the pedestrian changing direction and/or acceleration suddenly versus typical pedestrian movement.

In some examples, the grid component 304 can output the grid 306 based at least in part on the computing device 302 determining that an object leaves a roadway, a driveway, or other drivable surface. For instance, the grid component 304 can output the grid 306 based on an object trajectory indicating that the object will not be associated with a road or drivable area. Additionally or alternatively, the grid component 304 can output the grid 306 based at least in part on the computing device 302 determining that a more in depth prediction for an object is desired (e.g., the grid can be used to provide a more detailed prediction for a group of pedestrians or other objects in, by, or off of a roadway). Using the grid 306 as described herein enables the prediction component 104 to provide additional and/or more accurate predictions while using fewer computational resources (e.g., memory and/or processing resources) versus approaches that do not implement the grid 306.

In some examples, the computing device 302 may determine a location of the object relative to a roadway centerline 310, and determine a grid location to output the grid 306 based at least in part on the location of the object being within a threshold distance of the roadway centerline 310. For instance, the vehicle 112 may increase a distance from the roadway centerline 310 over time thereby causing the grid component 304 to output the grid 306 to encompass areas associated with the roadway 118 and/or areas outside the roadway 118, such as a driveway adjacent the building 114.

In some examples, the computing device 302 can determine and/or receive an indication of an object type associated with an object, and the grid component 304 can generate the grid 306 based at least in part on the object type associated with the object. For instance, in examples when the object is a pedestrian, the grid component 304 can determine one or more of a size of the grid, a position of the grid, or a number and/or spacing of grid points 308 based on behavior of a typical pedestrian in the environment. For example, a larger sized grid may be used when the pedestrian is moving at relatively higher speeds, and the position of the grid may be generally in front of the pedestrian, though the grid may also surround the pedestrian to account for possible movement in any direction including suddenly moving backwards from a current position. In various examples, the number of grid points may depend on objects or features surrounding the pedestrian (e.g., more grid points in dense urban environments with many objects and features to capture more possible positions of the object).

In various examples, the grid component 304 can determine a grid location relative to an object based at least in part on the object type. For instance, the vehicle 112 may be approaching the roadway boundary 120, be changing speed (e.g., slowing down near the roadway boundary), using a turn signal, and so on to indicate that the vehicle 112 may exit the roadway 118 at a future time. In various examples, the grid component 304 can output the grid 306 at the grid location usable for determining an object trajectory, a classification associated with the object trajectory, and metadata. The grid location may be substantially in front of the vehicle 112 based on a speed or other dynamics of the vehicle 112. In various examples, the grid 306 may be output based on comparing a current speed of an object to a speed threshold (e.g., a grid may be output for an object moving slow or fast relative to other objects). In various examples, the prediction component 104 may determine the object trajectory 128 based at least in part on assigning a probability of the vehicle occupying each grid point at a future time.

In some examples, data associated with one or more objects in the environment can be associated with one or more of the grid points 308. For instance, a grid point can comprise one or more of: a velocity associated with an object located near the grid point or a yaw associated with the object located near the grid point. In some examples, the grid points 308 may indicate information (e.g., velocities, yaws, and so on) about the one or more objects when the object is near, at, or passing through a respective grid point.

Figure 4:
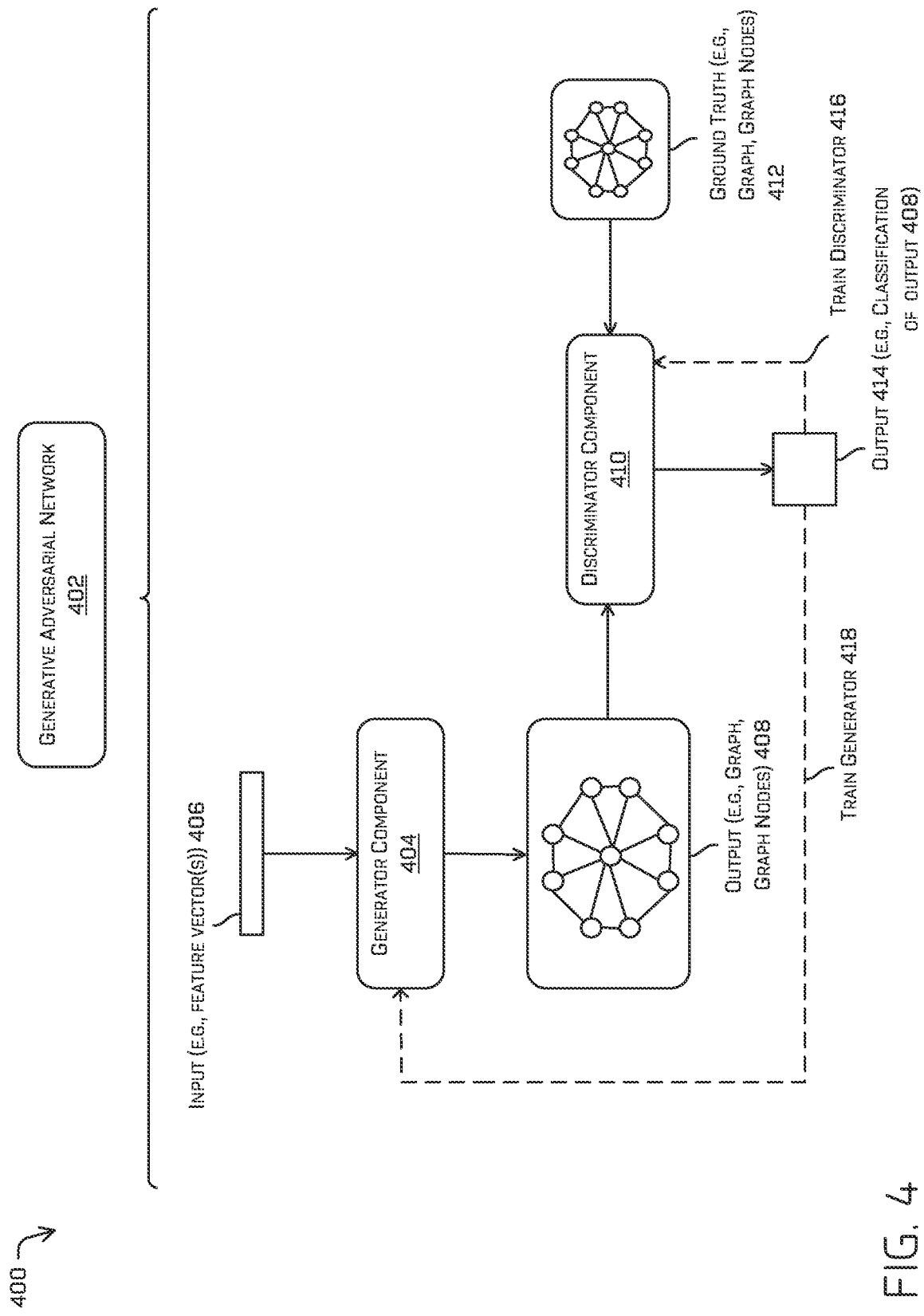
FIG. 4 depicts an example training component implemented by a computing device to train an example machine learned model.

FIG. 4 illustrates an example block diagram 400 of an example generative adversarial network implemented by a computing device to generate a graph of an environment. The techniques described in the example 400 may be performed by a computing device such as the computing device 302, the vehicle computing device(s) 504 and/or the computing device(s) 534.

As illustrated in FIG. 4, the generative adversarial network 402 comprises a generator component 404 that is configured to receive an input 406 of one or more feature vectors (e.g., feature vector 226 and/or feature vector 230) and determine an output 408 representing a graph with graph nodes. The output 408 of the generator component 404 can be input into a discriminator component 410 that is configured to also receive ground truth 412 (e.g., a real world graph that is not necessarily used to compare with the output by the generator), and determine an output 414 indicative of a classification of the output 408 from the generator component 404 (e.g., determine whether the graph is real or fake). In various examples, the output 414 can be used to train the discriminator component 416 and/or train the generator 418.

In some examples, the generative adversarial network 402 can output data representing a graph that is usable by a graph neural network to determine a scene for simulation. For example, the output 408 can be sent to the graph neural network which generates a scene based at least in part on the output 408. In such examples, the computing device can perform a simulation with an autonomous vehicle in the scene.

In some examples, the input 406 into the generator component 404 can comprise vector representations of an environment (e.g., the environment 100) and objects in the environment. For example, the generative adversarial network 402 can receive a first vector representation comprising one or more vectors representing static features in an environment and receive a second vector representation of an object in the environment. The generator network 404 can combine (e.g., concatenate), as a combined vector and by the generative adversarial network, the first vector representation and the second vector representation, and generate, based at least in part on the combined vector, the output 408 including the graph comprising a set of graph nodes. In such examples, a graph node of the set of graph nodes can represent a feature of the environment such as a crosswalk, a roadway, and so on, and another graph node can represent an object in the environment. The generator network 404 can associate the set of graph nodes (determine a relationship/dependency among the nodes) to generate the output 408.

In various examples, the generator network 404 can add and/or remove one or more graph nodes based at least in part on distances, importance, attention, etc. determined between two graph nodes. For instance, the generator network 404 can implement a graph neural network to determine connections between nodes representing an environment based at least in part on whether an object in the environment changes position, speed, acceleration, or the like over time. In some examples, the generator network 404 can determine whether to add, remove, and/or update data associated with a node based on an object type (e.g., whether the node is associated with a pedestrian, a vehicle, a truck, a bicyclist, etc.). In a non-limiting example, a node may be added or removed from a graph based at least in part on a horizon, or a change in the borazon over time.

In some examples, the generator network 404 can determine weights of edges between the graph nodes. The weight of an edge represents a level of interaction between the graph nodes that can change dynamically by the generator network 404. In some examples, the generator network 404 can determine the output 408 to represent a less-than-fully-connected graph (e.g., prunes nodes rather than assign weights to all edges of the graph).

In some examples a computing device can receive sensor data associated with one or more sensors of an autonomous vehicle, and receive map data associated with the environment. In such examples, the computing device can determine a first vector representation based at least in part on sensor data and/or determine a second vector representation based at least in part on map data.

In some examples, the input 406 into the generator component 404 can represent feature vectors within a threshold distance of an autonomous vehicle in the environment. For instance, the generator component 404 can determine, as a comparison, that at least a portion of the first vector representation and at least a portion of the second vector representation are within a threshold distance of an autonomous vehicle in the environment, and based at least in part on the comparison, inputting the portion of the first vector representation and the portion of the second vector representation into the generator component 404.

As mentioned above, the output 414 can be used to train the generator component 404 to improve realism of the output 408. In some examples, the generator component 404 can receive an indication of the classification (e.g., a state of the output) and update one or more parameters used during processing. Additionally or alternatively, the generator component 404 can receive, as training data, a graph with a set of graph nodes usable to determine connections between the graph nodes.

In some examples, the generative adversarial network 402 can receive training data representing a top-down view of an environment, map data, and object data. In some examples, the training data can be represented as one or more vectors. The generator component 404 can determine the output 408 based at least in part on the training data. The output can represent a graph that is usable for generating a scene in an environment. The scene can be used in a simulation with an autonomous vehicle to test a response of a vehicle controller that controls actions performed by the autonomous vehicle. Additional details of generating simulation scenarios is described in U.S. patent application Ser. No. 16/457,679, filed on Jun. 28, 2019, entitled "Synthetic Scenario Generator Based on Attributes," and in U.S. patent application Ser. No. 16/392,094, filed on Apr. 23, 2019, entitled "Scenario Editor and Simulator," which are incorporated herein by reference in its entirety.

Figure 5:
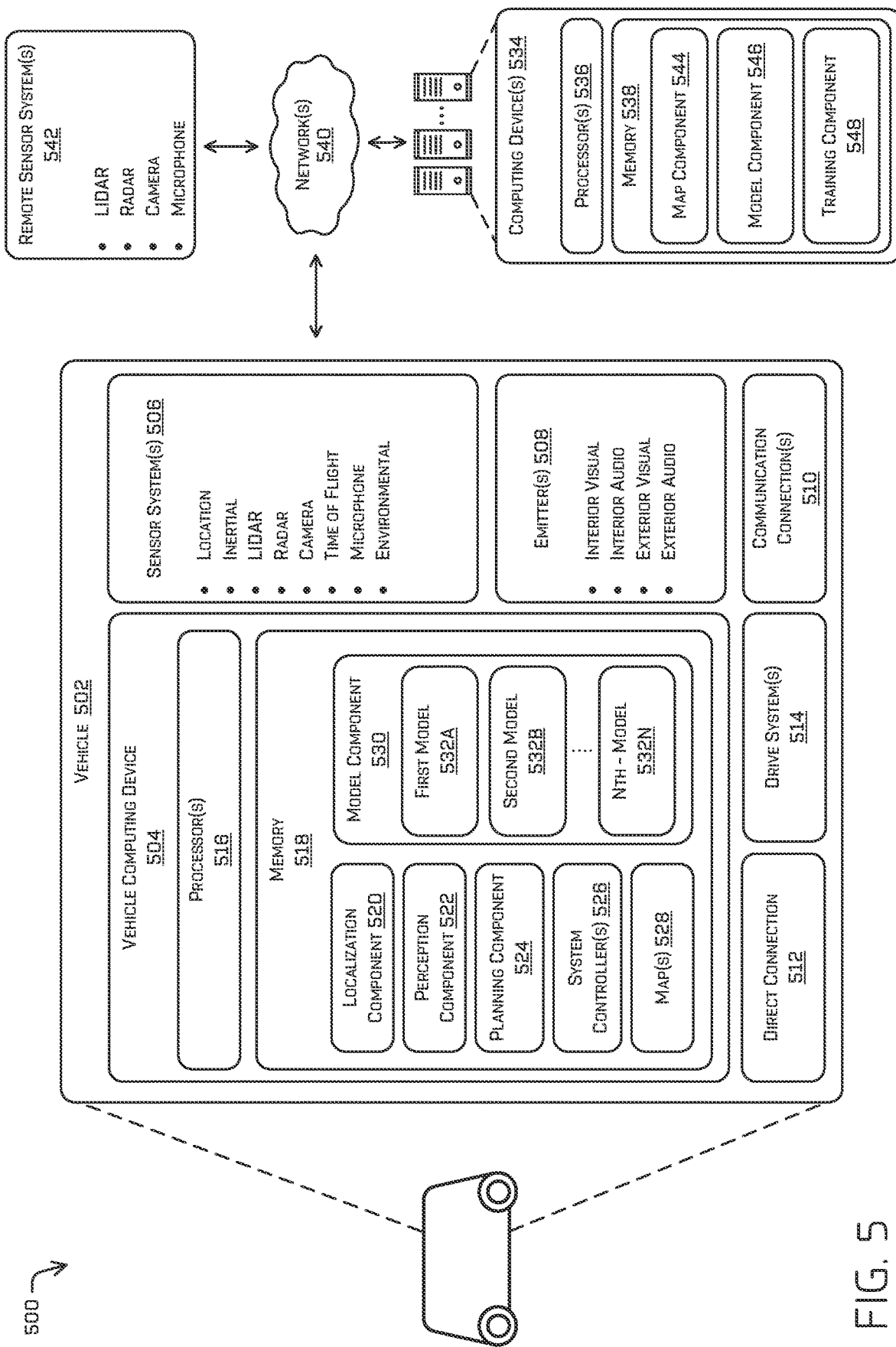
FIG. 5 is a block diagram of an example system for implementing the techniques described herein.

FIG. 5 is a block diagram of an example system 500 for implementing the techniques described herein. In at least one example, the system 500 may include a vehicle, such as vehicle 502.

The vehicle 502 may include a vehicle computing device 504, one or more sensor systems 506, one or more emitters 508, one or more communication connections 510, at least one direct connection 512, and one or more drive system(s) 514.

The vehicle computing device 504 may include one or more processors 516 and memory 518 communicatively coupled with the one or more processors 516. In the illustrated example, the vehicle 502 is an autonomous vehicle; however, the vehicle 502 could be any other type of vehicle, such as a semi-autonomous vehicle, or any other system having at least an image capture device (e.g., a camera enabled smartphone). In some instances, the autonomous vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 502 may be a fully or partially autonomous vehicle having any other level or classification.

In various examples, the vehicle computing device 504 may store sensor data associated with actual location of an object at the end of the set of estimated states (e.g., end of the period of time) and may use this data as training data to train one or more models. In some examples, the vehicle computing device 504 may provide the data to a remote computing device (i.e., computing device separate from vehicle computing device such as the computing device(s) 534) for data analysis. In such examples, the remote computing device(s) may analyze the sensor data to determine an actual location, velocity, direction of travel, or the like of the object at the end of the set of estimated states. Additional details of training a machine learned model based on stored sensor data by minimizing differences between actual and predicted positions and/or predicted trajectories is described in U.S. patent application Ser. No. 16/282,201, filed on Mar. 12, 2019, entitled "Motion Prediction Based on Appearance," which is incorporated herein by reference.

In the illustrated example, the memory 518 of the vehicle computing device 504 stores a localization component 520, a perception component 522, a planning component 524, one or more system controllers 526, one or more maps 528, and a model component 530 including one or more model(s), such as a first model 532A, a second model 532B, up to an Nth model 532N (collectively "models 532"), where N is an integer. Though depicted in FIG. 5 as residing in the memory 518 for illustrative purposes, it is contemplated that the localization component 520, a perception component 522, a planning component 524, one or more system controllers 526, one or more maps 528, and/or the model component 530 including the model(s) 532 may additionally, or alternatively, be accessible to the vehicle 502 (e.g., stored on, or otherwise accessible by, memory remote from the vehicle 502, such as, for example, on memory 538 of a remote computing device 534). In some examples, the models 532 can provide functionality associated with the prediction component 104.

In at least one example, the localization component 520 may include functionality to receive data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment, such as from map(s) 528 and/or map component 544, and may continuously determine a location and/or orientation of the autonomous vehicle within the map. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 520 may provide data to various components of the vehicle 502 to determine an initial position of an autonomous vehicle for determining the relevance of an object to the vehicle 502, as discussed herein.

In some instances, the perception component 522 may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.). In additional or alternative examples, the perception component 522 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

In general, the planning component 524 may determine a path for the vehicle 502 to follow to traverse through an environment. For example, the planning component 524 may determine various routes and trajectories and various levels of detail. For example, the planning component 524 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 524 may generate an instruction for guiding the autonomous vehicle along at least a portion of the route from the first location to the second location. In at least one example, the planning component 524 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 502 to navigate.

In some examples, the planning component 524 may include a prediction component to generate predicted trajectories of objects (e.g., objects) in an environment and/or to generate predicted candidate trajectories for the vehicle 502. For example, a prediction component may generate one or more predicted trajectories for objects within a threshold distance from the vehicle 502. In some examples, a prediction component may measure a trace of an object and generate a trajectory for the object based on observed and predicted behavior.

In at least one example, the vehicle computing device 504 may include one or more system controllers 526, which may be configured to control steering, propulsion, braking, safety, emitters, communication, and other systems of the vehicle 502. The system controller(s) 526 may communicate with and/or control corresponding systems of the drive system(s) 514 and/or other components of the vehicle 502.

The memory 518 may further include one or more maps 528 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the map(s) 528. That is, the map(s) 528 may be used in connection with the localization component 520, the perception component 522, and/or the planning component 524 to determine a location of the vehicle 502, detect objects in an environment, generate routes, determine actions and/or trajectories to navigate within an environment.

In some examples, the one or more maps 528 may be stored on a remote computing device(s) (such as the computing device(s) 534) accessible via network(s) 540. In some examples, multiple maps 528 may be stored based on, for example, a characteristic (e.g., type of entity, time of day, day of week, season of the year, etc.). Storing multiple maps 528 may have similar memory requirements, but increase the speed at which data in a map may be accessed.

As illustrated in FIG. 5, the vehicle computing device 504 may include a model component 530. The model component 530 may be configured to perform the functionality of the prediction component 104, including predicting object trajectories and metadata, such as object trajectories 122, 124, 126, and 128 of FIG. 1. In various examples, the model component 530 may receive one or more features associated with the detected object(s) from the perception component 522 and/or from the sensor system(s) 506. In some examples, the model component 530 may receive environment characteristics (e.g., environmental factors, etc.) and/or weather characteristics (e.g., weather factors such as snow, rain, ice, etc.) from the perception component 522 and/or the sensor system(s) 506. While shown separately in FIG. 5, the model component 530 could be part of the planning component 524 or other component(s) of the vehicle 502.

In various examples, the model component 530 may send predictions from the one or more models 532 that may be used by the planning component 524 to generate one or more predicted trajectories of the object (e.g., direction of travel, speed, etc.) and/or one or more predicted trajectories of the object (e.g., direction of travel, speed, etc.), such as from the prediction component thereof. In some examples, the planning component 524 may determine one or more actions (e.g., reference actions and/or sub-actions) for the vehicle 502, such as vehicle candidate trajectories. In some examples, the model component 530 may be configured to determine whether an object occupies a future position based at least in part on the one or more actions for the vehicle 502. In some examples, the model component 530 may be configured to determine the actions that are applicable to the environment, such as based on environment characteristics, weather characteristics, or the like.

The model component 530 may generate sets of estimated states of the vehicle and one or more detected objects forward in the environment over a time period. The model component 530 may generate a set of estimated states for each action (e.g., reference action and/or sub-action) determined to be applicable to the environment. The sets of estimated states may include one or more estimated states, each estimated state including an estimated position of the vehicle and an estimated position of a detected object(s). In some examples, the estimated states may include estimated positions of the detected objects at an initial time (T=0) (e.g., current time).

The estimated positions may be determined based on a detected trajectory and/or predicted trajectories associated with the object. In some examples, the estimated positions may be determined based on an assumption of substantially constant velocity and/or substantially constant trajectory (e.g., little to no lateral movement of the object). In some examples, the estimated positions (and/or potential trajectories) may be based on passive and/or active prediction. In some examples, the model component 530 may utilize physics and/or geometry based techniques, machine learning, linear temporal logic, tree search methods, heat maps, and/or other techniques for determining predicted trajectories and/or estimated positions of objects.

In various examples, the estimated states may be generated periodically throughout the time period. For example, the model component 530 may generate estimated states at 0.1 second intervals throughout the time period. For another example, the model component 530 may generate estimated states at 0.05 second intervals. The estimated states may be used by the planning component 524 in determining an action for the vehicle 502 to take in an environment.

In various examples, the model component 530 may utilize machine learned techniques to predict object trajectories and metadata (and probabilities associated with each object trajectory). In such examples, the machine learned algorithms may be trained to determine, based on sensor data and/or previous predictions by the model, that an object is likely to behave in a particular way relative to the vehicle 502 at a particular time during a set of estimated states (e.g., time period). In such examples, one or more of the vehicle 502 state (position, velocity, acceleration, trajectory, etc.) and/or the object state, classification, etc. may be input into such a machine learned model and, in turn, a trajectory prediction may be output by the model.

In various examples, characteristics associated with each object type may be used by the model component 530 to determine an object velocity or acceleration. Examples of characteristics of an object type may include, but are not be limited to: a maximum longitudinal acceleration, a maximum lateral acceleration, a maximum vertical acceleration, a maximum speed, maximum change in direction for a given speed, and the like.

As can be understood, the components discussed herein (e.g., the localization component 520, the perception component 522, the planning component 524, the one or more system controllers 526, the one or more maps 528, the model component 530 including the model(s) 532 are described as divided for illustrative purposes. However, the operations performed by the various components may be combined or performed in any other component.

While examples are given in which the techniques described herein are implemented by a planning component and/or a model component of the vehicle, in some examples, some or all of the techniques described herein could be implemented by another system of the vehicle, such as a secondary safety system. Generally, such an architecture can include a first computing device to control the vehicle 502 and a secondary safety system that operates on the vehicle 502 to validate operation of the primary system and to control the vehicle 502 to avoid collisions.

In some instances, aspects of some or all of the components discussed herein may include any models, techniques, and/or machine learned techniques. For example, in some instances, the components in the memory 518 (and the memory 538, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device 504. Additionally, or in the alternative, the sensor system(s) 506 may send sensor data, via the one or more networks 540, to the one or more computing device(s) 534 at a particular frequency, after a lapse of a predetermined period of time, in near real-time, etc.

The vehicle 502 may also include one or more emitters 508 for emitting light and/or sound. The emitters 508 may include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 may also include one or more communication connections 510 that enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 510 may allow the vehicle to communicate with other nearby computing device(s) (e.g., remote computing device 534, other nearby vehicles, etc.) and/or one or more remote sensor system(s) 542 for receiving sensor data. The communications connection(s) 510 also enable the vehicle 502 to communicate with a remote teleoperations computing device or other remote services.

The communications connection(s) 510 may include physical and/or logical interfaces for connecting the vehicle computing device 504 to another computing device or a network, such as network(s) 540. For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include one or more drive systems 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor systems to detect conditions of the drive system(s) 514 and/or the surroundings of the vehicle 502. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 514. In some cases, the sensor system(s) on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 514. Furthermore, the drive system(s) 514 may also include one or more communication connection(s) that enable communication by the respective drive module with one or more other local or remote computing device(s).

In at least one example, the direct connection 512 may provide a physical interface to couple the one or more drive system(s) 514 with the body of the vehicle 502. For example, the direct connection 512 may allow the transfer of energy, fluids, air, data, etc. between the drive system(s) 514 and the vehicle. In some instances, the direct connection 512 may further releasably secure the drive system(s) 514 to the body of the vehicle 502.

In at least one example, the localization component 520, the perception component 522, the planning component 524, the one or more system controllers 526, the one or more maps 528, and the model component 530, may process sensor data, as described above, and may send their respective outputs, over the one or more network(s) 540, to the computing device(s) 534. In at least one example, the localization component 520, the perception component 522, the planning component 524, the one or more system controllers 526, the one or more maps 528, and the model component 530 may send their respective outputs to the remote computing device(s) 534 at a particular frequency, after a lapse of a predetermined period of time, in near real-time, etc.

In some examples, the vehicle 502 may send sensor data to the computing device(s) 534 via the network(s) 540. In some examples, the vehicle 502 may receive sensor data from the computing device(s) 534 and/or remote sensor system(s) 542 via the network(s) 540. The sensor data may include raw sensor data and/or processed sensor data and/or representations of sensor data. In some examples, the sensor data (raw or processed) may be sent and/or received as one or more log files.

The computing device(s) 534 may include processor(s) 536 and a memory 538 storing the map component 544, a sensor data processing component 546, and a training component 548. In some examples, the map component 544 may include functionality to generate maps of various resolutions. In such examples, the map component 544 may send one or more maps to the vehicle computing device 504 for navigational purposes. In various examples, the sensor data processing component 546 may be configured to receive data from one or more remote sensors, such as sensor system(s) 506 and/or remote sensor system(s) 542. In some examples, the sensor data processing component 546 may be configured to process the data and send processed sensor data to the vehicle computing device 504, such as for use by the model component 530 (e.g., the model(s) 532). In some examples, the sensor data processing component 546 may be configured to send raw sensor data to the vehicle computing device 504.

In some instances, the training component 548 (e.g., trained in accordance with the techniques discussed in FIG. 4) can include functionality to train a machine learning model to output probabilities for whether an occluded region is free of any objects or whether the occluded region is occupied by a static obstacle or a dynamic object. For example, the training component 548 can receive sensor data that represents an object traversing through an environment for a period of time, such as 0.1 milliseconds, 1 second, 3, seconds, 5 seconds, 7 seconds, and the like. At least a portion of the sensor data can be used as an input to train the machine learning model.

In some instances, the training component 548 may be executed by the processor(s) 536 to train the a machine learning model based on training data. The training data may include a wide variety of data, such as sensor data, audio data, image data, map data, inertia data, vehicle state data, historical data (log data), or a combination thereof, that is associated with a value (e.g., a desired classification, inference, prediction, etc.). Such values may generally be referred to as a "ground truth." To illustrate, the training data may be used for determining risk associated with occluded regions and, as such, may include data representing an environment that is captured by an autonomous vehicle and that is associated with one or more classifications or determinations. In some examples, such a classification may be based on user input (e.g., user input indicating that the data depicts a specific risk) or may be based on the output of another machine learned model. In some examples, such labeled classifications (or more generally, the labeled output associated with training data) may be referred to as ground truth.

In some instances, the training component 548 can include functionality to train a machine learning model to output classification values. For example, the training component 548 can receive data that represents labelled collision data (e.g. publicly available data, sensor data, and/or a combination thereof). At least a portion of the data can be used as an input to train the machine learning model. Thus, by providing data where the vehicle traverses an environment, the training component 548 can be trained to output occluded value(s) associated with objects and/or occluded region(s), as discussed herein.

In some examples, the training component 548 can include training data that has been generated by a simulator. For example, simulated training data can represent examples where a vehicle collides with an object in an environment or nearly collides with an object in an environment, to provide additional training examples.

The processor(s) 516 of the vehicle 502 and the processor(s) 536 of the computing device(s) 534 may be any suitable processor capable of executing instructions to process data and perform operations as described herein. By way of example and not limitation, the processor(s) 516 and 536 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and memory 538 are examples of non-transitory computer-readable media. The memory 518 and memory 538 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 5 is illustrated as a distributed system, in alternative examples, components of the vehicle 502 may be associated with the computing device(s) 534 and/or components of the computing device(s) 534 may be associated with the vehicle 502. That is, the vehicle 502 may perform one or more of the functions associated with the computing device(s) 534, and vice versa.

Figure 6A:
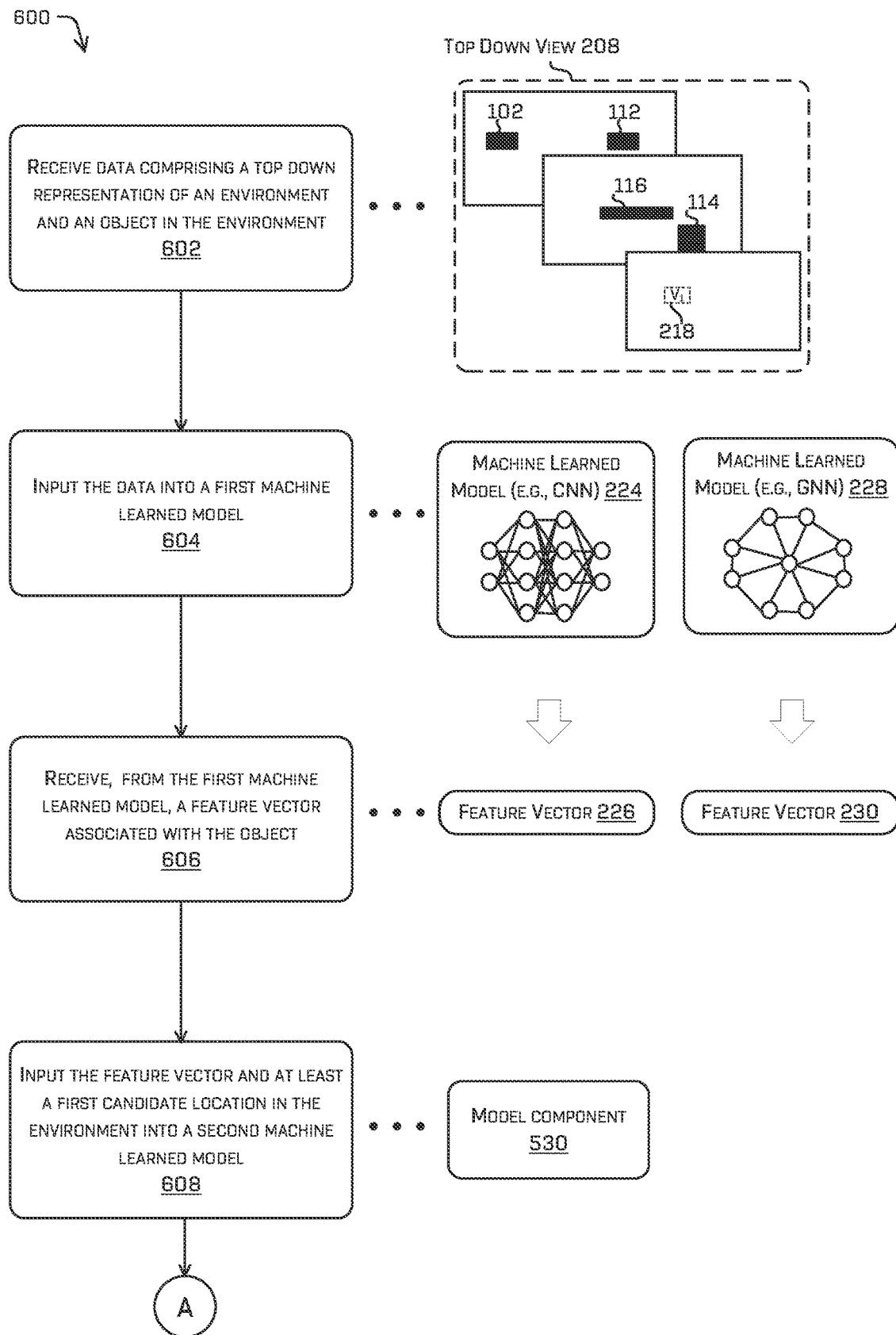
FIG. 6A is a first part of a flowchart depicting an example process for determining a predicted object trajectory using one or more example models.

FIG. 6A is a first part of a flowchart depicting an example process 600 for determining a predicted object trajectory using one or more example models. Some or all of the process 600 may be performed by one or more components in FIG. 5, as described herein. For example, some or all of process 600 may be performed by the vehicle computing device 504.

At operation 602, the process may include receiving data comprising a top down representation of an environment and an object in the environment. For example, the model component 530 can receive sensor data from the perception component 522 and map data from the map(s) 528 and/or the map component 544. The vehicle computing device may be configured to receive sensor data representing one or more objects in an environment (e.g., vehicle 112). In some examples, the vehicle computing device may be configured to detect dynamic objects and/or static objects and combine the associated sensor data with map data. In some examples, the map data may represent fixed features of an environment including but not limited to crosswalks, traffic signals, school zones, and the like. the model component 530 may also or instead receive object state data such as position data, orientation data, heading data, velocity data, speed data, acceleration data, yaw rate data, or turning rate data associated with the object.

In some examples, the data can be determined by the vehicle computing device based on comparing historical sensor data to determine position, orientation, heading, velocity, and so on of objects having a same object type. In various examples, the potential object may be assigned a velocity, acceleration, and/or trajectory that represents characteristics of the object type (e.g., a maximum acceleration for a pedestrian).

At operation 604, the process may include inputting the data into a first machine learned model. For example, a convolutional neural network (e.g., the convolutional neural network 224) and/or a graph neural network (e.g., the graph neural network 228) of the model component 530 can receive the data as input.

At operation 606, the process may include receiving, from the first machine learned model, a feature vector associated with the object. For instance, the convolutional neural network 224 can output the feature vector 226 and/or the graph neural network 224 can output the feature vector 230. In some examples, the model component 530 can receive multiple feature vectors from one or more machine learned models.

At operation 608, the process may include inputting the feature vector and at least a first candidate location in the environment into a second machine learned model. For example, the model component 546 may implement a multi-layer perceptron to process the one or more feature vectors received from the first machine learned model. One or more candidate locations can be determined by the model component 530 based at least in part on object state data, sensor data, map data, and so on. For example, a grid point of the grid 304 can be used to identify potential locations of the object in the future.

Figure 6B:
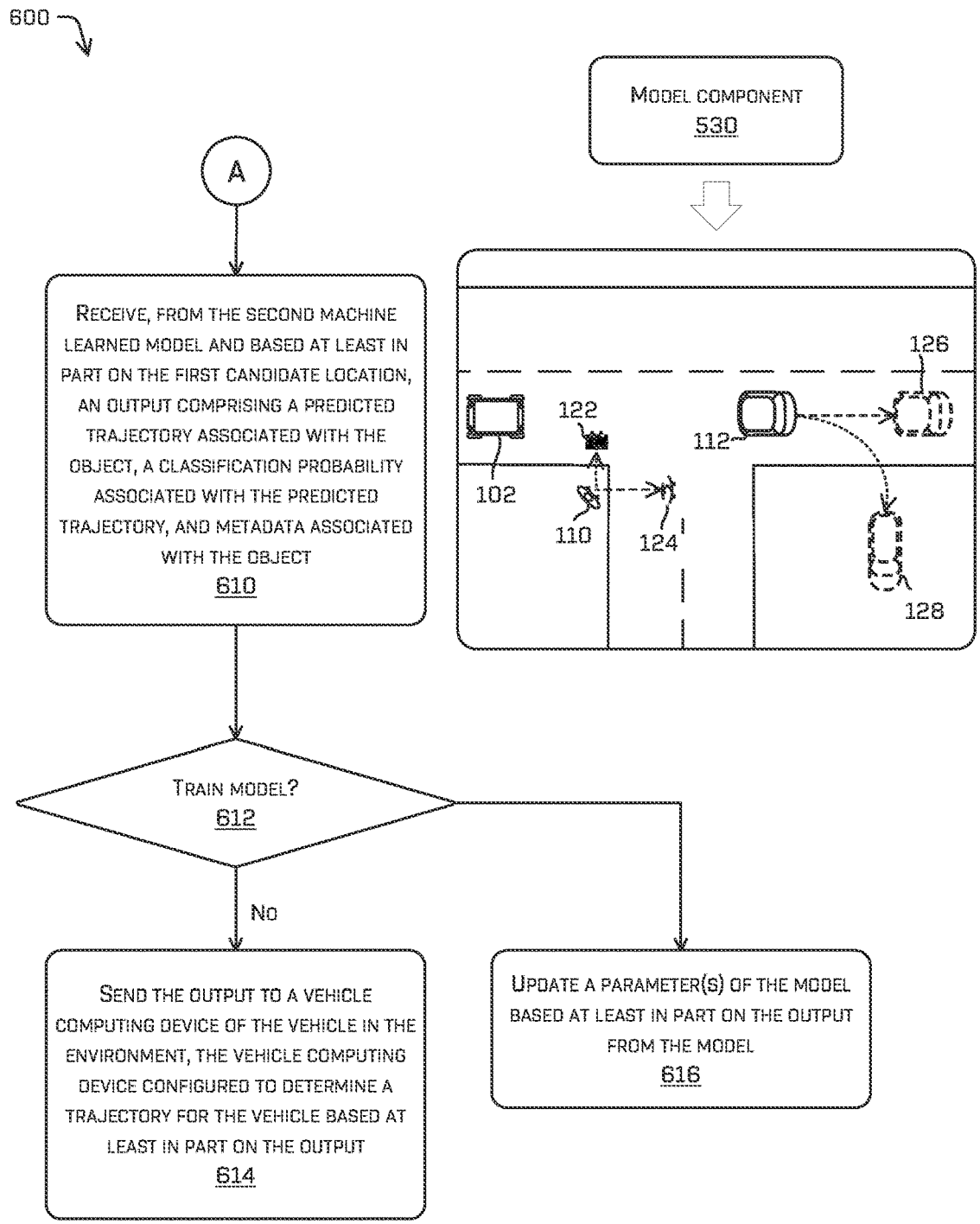
FIG. 6B is a second part of the flowchart depicting the example process for determining a predicted object trajectory using one or more example models.

FIG. 6B is a second part of the flowchart depicting the example process 600 for determining a predicted object trajectory using one or more example models.

At operation 610, the process may include receiving, from the second machine learned model and based at least in part on the first candidate location, an output comprising a predicted trajectory associated with the object, a classification probability associated with the predicted trajectory, and metadata associated with the object. For instance, the operation can include the model component 530 using the grid 304 and the vector representations 204, 206, 220, and/or 222 to determine one or more object trajectories for one or more objects in the environment (e.g., the object trajectories 126 and/or 128 associated with the vehicle 112, the object trajectories 122 and/or 124 associated with the pedestrian 110, and so on). In some examples, the second machine learned model can output the predicted trajectory associated with the object based at least in part on non-maximal suppression. For example, the second machine learned model can employ non-maximal suppression on data associated with the grid 304 and the vector representations 204, 206, 220, and/or 222 to determine one or more object trajectories for one or more objects in the environment.

At operation 612, the process may include determining if a model is currently being trained, or whether the model has been trained previously. For instance, the operation 612 can include determining if the machine learned model 224 and/or the machine learned model 228 are being trained. If the model is not being trained (e.g., "no" in the operation 612), the process can continue to operation 614 to send output information from the model to a computing device and/or to a vehicle computing device to perform a simulation. If the model is being trained (e.g., "yes" in the operation 612), the process continues to operation 616 to update a parameter(s) of the model based at least in part on the output by the model. Of course, in some examples, operations can be performed in parallel, depending on an implementation.

At operation 614, the process may include sending the output to a vehicle computing device of the vehicle in the environment. In various examples, the vehicle computing device is configured to determine a trajectory for the vehicle (e.g., trajectory 130 for the vehicle 102) based at least in part on the output. For example, an output from the model component 530 can be sent to the perception component 522 or the planning component 524, just to name a few. In various examples, the vehicle computing device may control operation of the vehicle, such as the planning component 524. The vehicle computing device may determine a vehicle trajectory based at least in part on the predicted trajectory, the classification probability associated with the predicted trajectory, and the metadata thereby improving vehicle safety by planning for the possibility that the object may behave unexpectedly at a point in time. Additional details of controlling a vehicle using one or more outputs from one or more modes are discussed throughout the disclosure.

At the operation 616, one or more parameters of the model may be updated, altered, and/or augemneted to train the model. In some instances, the output from the model component 530 can be compared against training data (e.g., ground truth representing labelled data) for use in training. Based at least in part on the comparison, the training component 548 can identify parameter(s) associated with the model component 530 for updating. In various examples, the output may be used to train models such as the convolutional neural network 224 and/or the graph neural network.

Figure 7:
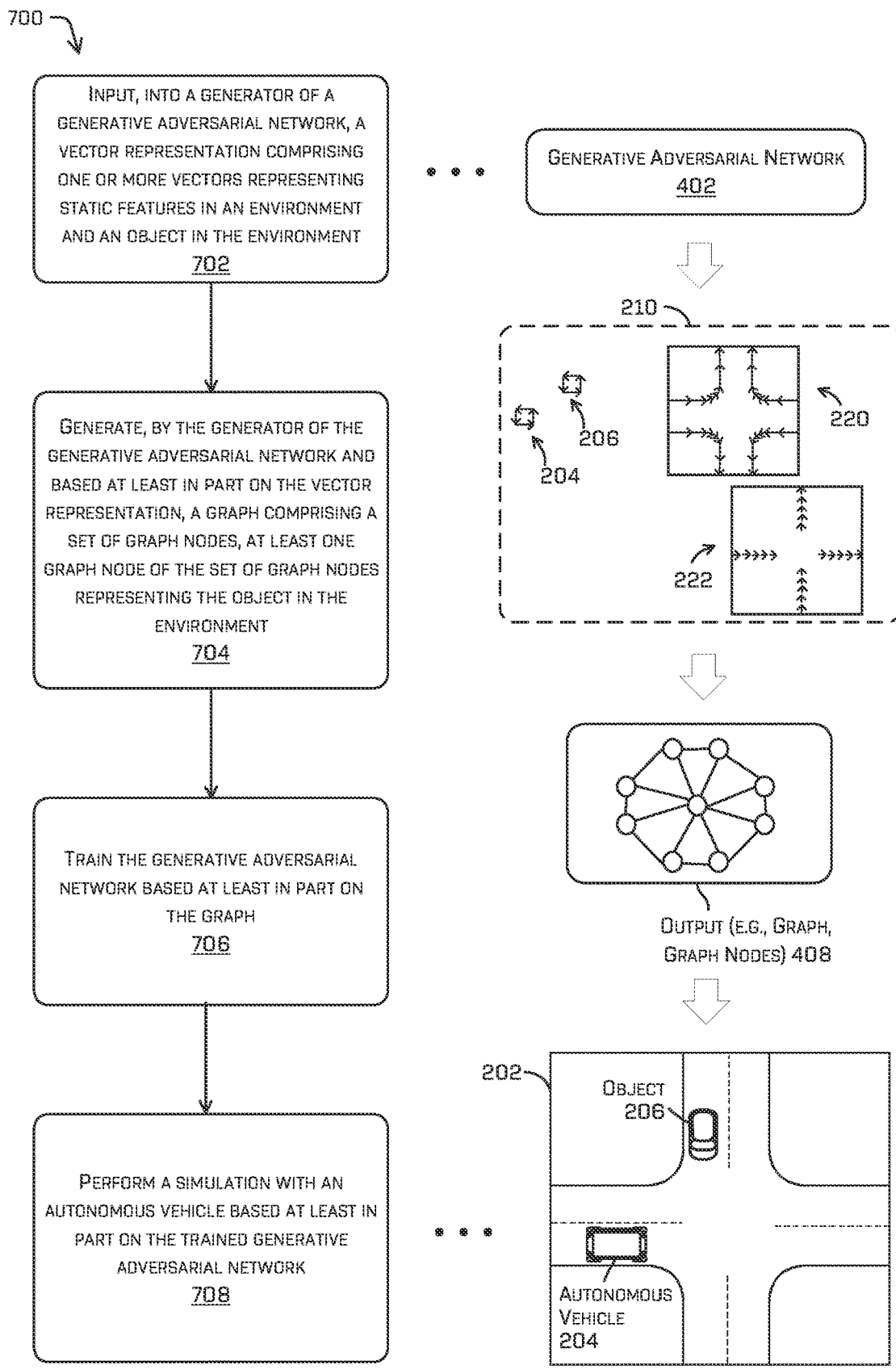
FIG. 7 is flowchart depicting an example process 700 for generating a graph using an example generative adversarial network.

FIG. 7 is flowchart depicting an example process 700 for generating a graph using an example generative adversarial network. Some or all of the process 700 may be performed by one or more components in FIG. 5, as described herein. For example, some or all of process 700 may be performed by the vehicle computing device 504.

At operation 702, the process may include inputting, into a generator of a generative adversarial network, a vector representation comprising one or more vectors representing static features in an environment and an object in the environment. For example, the generative adversarial network 402 can receive vectorized data representing building, intersections, crosswalks, and the like (e.g., the vector representation 210 of the environment 202). The vehicle computing device may be configured to receive sensor data representing static features in the environment (e.g., crosswalk 116, roadway boundary 122, roadway centerline 310, etc.), and output vectors to represent the static features. In some examples, map data can be received that represents fixed features of the environment including but not limited to crosswalks, traffic signals, school zones, and the like.

At operation 704, the process may include generating, by the generator of the generative adversarial network and based at least in part on the vector representation, a graph comprising a set of graph nodes, at least one graph node of the set of graph nodes representing the object in the environment. For example, the generative adversarial network 402 can receive vectorized data representing an object state data such as position data, orientation data, heading data, velocity data, speed data, acceleration data, yaw rate data, or turning rate data associated with the object.

In some examples, the operation 704 can include the generator component 404 generating the output 408 (e.g., a graph with graph nodes to represent objects in the environment). In various examples, the generator component 404 can comprise a graph neural network that is configured to generate a graph structure based on the vectorized representation 210.

In various examples, the generative adversarial network 402 may implement the generator component 404 to generate the output 408. In such examples, the generative adversarial network 402 can implement one or more algorithms that are trained to find an association between the vectors of the vector representation 210. The output 408 from the generator component 404 can include graph nodes to represent different objects and/or features of the environment, and in some instances indicate the association in the graph.

In some examples, generative adversarial network 402 can combine or fuse a first vector representation with a second vector representation, and may use the combined vector representation to determine an output. In various examples, combining the vector representations can include concatenating the first vector representation and the second vector representation to form a combined vector usable to generate the output 408.

At operation 706, the process may include training the generative adversarial network based at least in part on the graph. For instance, the discriminator component 410 can output a classification (e.g., the output 414) associated with the output 408 from the generative adversarial network 402 (e.g., was the graph 306 produced by the generator component Y/N). In various examples, the output 414 can be used to train the generator component 404 and/or the discriminator component 410. For instance, the generator component 404 can be trained with ground truth graph data to improve generation of predicted graphs, while the discriminator component 410 can be trained to improve recognizing whether the generator component produced the graph (such as by using the ground truth 412).

At operation 708, the process may include performing a simulation with an autonomous vehicle based at least in part on the trained generative adversarial network. For example, the output 408 from the generator component 404 can represent a scene for use with an autonomous vehicle (e.g., the vehicle autonomous vehicle 204 or the vehicle 502). An output of the simulation can be used by a vehicle computing device that is configured to control the autonomous vehicle (e.g., determine a trajectory, control a drive system, a brake system, and so on).

FIGS. 1, 6A, 6B, and 7 illustrate an example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes. In some embodiments, one or more operations of the method may be omitted entirely. By way of example and not limitation, operations 604, 606, 610, and 614 may be performed without operations 602, 604, and 608. Moreover, the methods described herein can be combined in whole or in part with each other or with other methods.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the one or more processors to perform actions comprising: receiving sensor data from a sensor associated with a vehicle in an environment; determining, based at least in part on the sensor data, data comprising a top-down representation of an environment and an object in the environment; inputting the data into a first machine learned model; receiving, from the first machine learned model, a feature vector associated with the object; inputting the feature vector and at least a first candidate location in the environment into a second machine learned model, the first candidate location being determined based at least in part on dynamics of the vehicle and at least one of a centerline of a roadway segment or a grid; receiving, from the second machine learned model and based at least in part on the first candidate location, an output comprising a predicted trajectory associated with the object, a classification probability associated with the predicted trajectory, and metadata associated with the object; and sending the output to a vehicle computing device of the vehicle in the environment, the vehicle computing device configured to determine a trajectory for the vehicle based at least in part on the output.

B: The system of paragraph A, wherein: the top-down representation of the environment is a rasterized image or vectorized data.

C: The system of either paragraph A or B, the actions further comprising: determining that the object is within a threshold distance from the centerline of the roadway segment; determining the first candidate location in the environment based at least in part on the object being within the threshold distance from the centerline of the roadway segment; and generating, based at least in part on an attribute of the object, the grid comprising a grid point representing a second candidate location, wherein the output from the second machine learned model is further based at least in part on the second candidate location.

D: The system of paragraph C, the actions further comprising: determining an object type associated with the object; determining, based at least in part on the object type, one or more of: a size of the grid, a position of the grid, or a number of grid points; and determining the predicted trajectory associated with the object based at least in part on the size of the grid, the position of the grid, or the number of grid points.

E: The system of either paragraph C or D, wherein: the grid point comprises one or more of a velocity associated with the object when moving through the grid point or a yaw associated with the object when moving through the grid point.

F: A method comprising: receiving a feature vector associated with an object in an environment of a vehicle; determining a candidate location of the object in the environment based at least in part on dynamics of the vehicle and at least one of a centerline of a roadway segment or a grid; inputting, to a machine learned model, the feature vector and the candidate location of the object in the environment; receiving, from the machine learned model, an output comprising a predicted trajectory associated with the object, a classification probability associated with the predicted trajectory, and metadata associated with the object; and sending the output to a vehicle computing device of the vehicle in the environment, the vehicle computing device configured to determine a trajectory for the vehicle based at least in part on the output.

G: The method of paragraph F, wherein the machine learned model is a first machine learned model, the method further comprising: determining, by a second machine learned model, a first vectorized representation associated with a top-down representation of the environment and the object in the environment; determining, by the second machine learned model, a second vectorized representation comprising one or more of position data, orientation data, heading data, velocity data, speed data, acceleration data, yaw rate data, or turning rate data associated with the object; and determining the feature vector based at least in part on the first vector representation and the second vector representation.

H: The method of either paragraph F or G, further comprising: determining a grid location relative to the object; outputting a grid at the grid location; and determining the predicted trajectory associated with the object based at least in part on the grid.

I: The method of paragraph H, wherein: the grid comprises a plurality of grid points, a grid point of the plurality of grid points comprising at least one of a future location of the object, a velocity of the object when passing through the grid point, or a yaw of the object when passing through the grid point.

J: The method of any one of paragraphs F-I, wherein the machine learned model is a first machine learned model, the method further comprising: receiving sensor data from a sensor associated with a vehicle in an environment; determining, based at least in part on the sensor data, data comprising a top-down representation of the environment and the object in the environment; inputting the data into a second machine learned model; and receiving, from the second machine learned model, the feature vector associated with the object.

K: The method of any one of paragraphs F-J, further comprising: determining a speed of the object; comparing, as a comparison, the speed of the object to a speed threshold; and outputting, based at least in part on the comparison, a grid comprising a grid point representing the candidate location in the environment.

L: The method of any one of paragraphs F-K, wherein: the metadata indicates an attribute of the object over a time period; and the machine learned model comprises a multi-layer perceptron.

M: The method of any one of paragraphs F-L, wherein the predicted trajectory is a first predicted trajectory, the classification probability is a first classification probability, and the metadata is first metadata, the method further comprising: determining, by the machine learned model, a second predicted trajectory, a second classification probability associated with the second predicted trajectory, and second metadata associated with the object; determining, based at least in part on the first classification probability and the second classification probability, a rank of the first predicted trajectory relative to the second predicted trajectory; and controlling the vehicle based at least in part on the rank.

N: The method of any one of paragraphs F-M, further comprising. determining that the object is associated with a location in the environment off of a roadway; outputting grid points to represent potential future positions of the object; and determining the predicted trajectory based at least in part on the grid points.

O: The method of any one of paragraphs F-N, further comprising: determining a plurality of candidate trajectories; and determining the predicted trajectory associated with the object based at least in part on non-maximal suppression of the plurality of candidate trajectories.

P: One or more non-transitory computer-readable media storing instructions that, when executed, cause one or more processors to perform actions comprising: receiving a feature vector associated with an object in an environment of a vehicle; determining a candidate location of the object in the environment based at least in part on dynamics of the vehicle and at least one of a centerline of a roadway segment or a grid; inputting, to a machine learned model, the feature vector and the candidate location of the object in the environment; receiving, from the machine learned model, output comprising a predicted trajectory associated with the object, a classification probability associated with the predicted trajectory, and metadata associated with the object; and sending the output to a vehicle computing device of the vehicle in the environment, the vehicle computing device configured to determine a trajectory for the vehicle based at least in part on the output.

Q: The one or more non-transitory computer-readable media of paragraph P, wherein the machine learned model is a first machine learned model, and further comprising: determining, by a second machine learned model, a first vectorized representation comprising a top-down representation of an environment and an object in the environment; determining, by the second machine learned model, a second vectorized representation comprising one or more of position data, orientation data, heading data, velocity data, speed data, acceleration data, yaw rate data, or turning rate data associated with the object; and determining the feature vector based at least in part on the first vector representation and the second vector representation.

R: The one or more non-transitory computer-readable media of paragraph Q, the actions further comprising: determining an object type associated with the object; determining, based at least in part on the object type, a grid location relative to the object; outputting a grid at the grid location; and determining the predicted trajectory associated with the object based at least in part on the grid.

S: The one or more non-transitory computer-readable media of paragraph R, wherein: the grid comprises a plurality of grid points, a grid point of the plurality of grid points comprising at least one of a future location of the object, a velocity of the object when passing through the grid point, or a yaw of the object when passing through the grid point.

T: The one or more non-transitory computer-readable media of either paragraph R or S, the actions further comprising: determining a speed of the object; comparing, as a comparison, the speed of the object to a speed threshold; and outputting, based at least in part on the comparison, a grid comprising a grid point representing the candidate location in the environment.

U: A system comprising: one or more processors; and one or more non-transitory computer-readable media storing instructions executable by the one or more processors, wherein the instructions, when executed, cause the one or more processors to perform actions comprising: inputting, into a generator of a generative adversarial network, a vector representation comprising one or more vectors representing static features in an environment and an object in the environment; generating, by the generator of the generative adversarial network and based at least in part on the vector representation, a graph comprising a set of graph nodes, at least one graph node of the set of graph nodes representing the object in the environment; training the generative adversarial network based at least in part on the graph; and performing a simulation with an autonomous vehicle based at least in part on the trained generative adversarial network.

V: The system of paragraph U, wherein the generator comprises a graph neural network, and the actions further comprising: generating, by the graph neural network, a scene based at least in part on the graph; and performing the simulation with the autonomous vehicle in the scene.

W: The system of either paragraph U or V, the actions further comprising: determining, as a comparison, that at least a portion of the vector representation is within a threshold distance of the autonomous vehicle in the environment; and inputting, based at least in part on the comparison, the portion of the vector representation into the generative adversarial network.

X: The system of any one of paragraphs U-W, the actions further comprising: receiving sensor data associated with one or more sensors of an autonomous vehicle; receiving map data associated with the environment; determining first vector representation based at least in part on the sensor data and the map data.

Y: The system of any one of paragraphs U-X, the actions further comprising: receiving a training graph as training data, the training graph comprising a set of connected graph nodes representing a scene; and training the generative adversarial network based at least in part on the training graph.

Z: A method comprising: receiving, by a generator of a generative adversarial network, training data representing a top-down view of an environment, the training data comprising map data and an object in the environment, and the training data represented as one or more vectors associated with a graph neural network; determining, by the generator and based at least in part on the training data, an output representing a simulated scene; determining, by a discriminator of the generative adversarial network and based at least in part on the output, an indication of a state of the output; and training the generative adversarial network based at least in part on the indication.

AA: The method of paragraph Z, further comprising: performing a simulation with an autonomous vehicle in the simulated scene; and determining a response by a vehicle controller of the autonomous vehicle to the simulation.

AB: The method of either paragraph Z or AA, wherein determining the indication of the state of the output by the discriminator comprises determining a classification for whether the output was generated by the generator.

AC: The method of any one of paragraphs Z-AB, further comprising: receiving, from the graph neural network, a first vector representation of the training data comprising one or more vectors representing static features in the environment; receiving, from the graph neural network, a second vector representation of the training data comprising the object in the environment; and determining, by the generator and based at least in part on the first vector representation and the second vector representation, the output representing the simulated scene.

AD: The method of paragraph AC, further comprising: combining, as a combined vector and by the generative adversarial network, the first vector representation and the second vector representation; and determining, by the generator and based at least in part on the combined vector, the output representing the simulated scene.

AE: The method of any one of paragraphs Z-AD, further comprising: receiving sensor data associated with one or more sensors of an autonomous vehicle; determining a first vector representation based at least in part on sensor data; determining a second vector representation based at least in part on map data; and determining, by the generator and based at least in part on the first vector representation and the second vector representation, the output representing the simulated scene.

AF: The method of paragraph AE, wherein the output is a first output, and further comprising: receiving, by the discriminator of the generative adversarial network, a second output representing an actual environment; comparing, as a comparison and by the discriminator of the generative adversarial network, the first output and the second output; and determining, by the discriminator of the generative adversarial network and based at least in part on the comparison, whether the first output is generated by the generator; and training the generator based at least in part on whether the first output is generated by the generator.

AG: The method of any one of paragraphs Z-AF, further comprising: training the graph neural network based at least in part on the indication.

AH: The method of any one of paragraphs Z-AG, wherein: the one or more vectors representing one or more of: the object, a roadway segment, a crosswalk, an additional object, a school zone, or traffic signals.

AI: The method of any one of paragraphs Z-AH, further comprising: assigning a number of dynamic objects, static objects, or fixed features in the environment to be represented by the one or more vectors.

AJ: One or more non-transitory computer-readable media storing instructions that, when executed, cause one or more processors to perform actions comprising: receiving, by a generator of a generative adversarial network, training data representing a top-down view of an environment, the training data comprising map data and an object in the environment, and the training data represented as one or more vectors associated with a graph neural network; determining, by the generator and based at least in part on the training data, an output representing a simulated scene; determining, by a discriminator of the generative adversarial network and based at least in part on the output, an indication of a state of the output; and training the generative adversarial network based at least in part on the indication.

AK: The one or more non-transitory computer-readable media of paragraph AJ, the actions further comprising: further comprising: performing a simulation with an autonomous vehicle in the simulated scene; and determining a response by a vehicle controller of the autonomous vehicle to the simulation.

AL: The one or more non-transitory computer-readable media of paragraph AK, the actions further comprising: receiving, from the graph neural network, a first vector representation of the training data comprising one or more vectors representing static features in the environment; receiving, from the graph neural network, a second vector representation of the training data comprising the object in the environment; and determining, by the generator and based at least in part on the first vector representation and the second vector representation, the output representing the simulated scene.

AM: The one or more non-transitory computer-readable media of paragraph AL, the actions further comprising: receiving sensor data associated with one or more sensors of an autonomous vehicle; determining a first vector representation based at least in part on sensor data; determining a second vector representation based at least in part on map data; and determining, by the generator and based at least in part on the first vector representation and the second vector representation, the output representing the simulated scene.

AN: The one or more non-transitory computer-readable media of either paragraph AL or AM, the actions further comprising: receiving a template graph as training data, the template graph comprising a set of connected nodes representing a scene; and training the generative adversarial network based at least in part on the template graph.

While the example clauses described below are described with respect to one particular implementation, it should be understood that, in the context of this document, the content of the example clauses can also be implemented via a method, device, system, computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the one or more processors to perform actions comprising:
receiving sensor data from a sensor associated with a vehicle in an environment;
determining, based at least in part on the sensor data, data comprising polylines representing the environment and an object in the environment;
inputting the data into a first machine learned model;
aggregating, by the first machine learned model, the polylines into a node data structure;
receiving, from the first machine learned model and based at least in part on the node data structure, a feature vector associated with the object;
inputting the feature vector and at least a first candidate location in the environment into a second machine learned model, the first candidate location being determined based at least in part on dynamics of the vehicle and a grid comprising a plurality of grid points indicating candidate locations for the object, wherein the object overlaps multiple grid points of the plurality of grid points;
receiving, from the second machine learned model and based at least in part on the first candidate location, a predicted trajectory associated with the object, a classification probability associated with the predicted trajectory, and metadata indicating an attribute of the object over a period of time;
determining, based at least in part on the metadata and the predicted trajectory, a vehicle trajectory; and
controlling the vehicle based at least in part on the vehicle trajectory.

2. The system of claim 1, the actions further comprising:
determining that the object is within a threshold distance from a centerline of a roadway segment;
determining the first candidate location in the environment based at least in part on the object being within the threshold distance from the centerline of the roadway segment;
generating, based at least in part on the attribute of the object, the grid comprising a grid point representing a second candidate location; and
inputting the second candidate location into the second machine learned model.

3. The system of claim 2, the actions further comprising:
determining an object type associated with the object;
determining, based at least in part on the object type, one or more of: a size of the grid, a position of the grid, or a number of the plurality of grid points; and
determining the predicted trajectory associated with the object based at least in part on the size of the grid, the position of the grid, or the number of the plurality of grid points.

4. The system of claim 2, wherein:
the grid point comprises one or more of a velocity associated with the object when moving through the grid point or a yaw associated with the object when moving through the grid point.

5. A method comprising:
receiving, as input into a first machine learned model, polylines representing an object or feature of an environment;
aggregating, by the first machine learned model, the polylines into a node data structure; and
outputting, by the first machine learned model and based at least in part on the node data structure, a feature vector;

receiving the feature vector associated with the object and the environment of a vehicle;

determining a candidate location of the object in the environment based at least in part on dynamics of the vehicle and a grid comprising a plurality of grid points indicating candidate locations for the object, wherein the object overlaps multiple grid points of the plurality of grid points;

inputting, to a second machine learned model, the feature vector and the candidate location of the object in the environment;

receiving, from the second machine learned model, a predicted trajectory associated with the object, a classification probability associated with the predicted trajectory, and metadata indicating an attribute of the object; and controlling the vehicle based at least in part on the metadata indicating the attribute of the object.

6. The method of claim 5, the method further comprising:
determining, by the first machine learned model, a first vectorized representation associated with a top-down representation of the environment and the object in the environment;
determining, by the first machine learned model, a second vectorized representation comprising one or more of: position data, orientation data, heading data, velocity data, speed data, acceleration data, yaw rate data, or turning rate data associated with the object; and
determining the feature vector based at least in part on the first vector representation and the second vector representation.

7. The method of claim 5, further comprising:
determining a grid location relative to the object;
outputting the grid at the grid location; and
determining the predicted trajectory associated with the object based at least in part on the grid.

8. The method of claim 7, wherein
a grid point of the plurality of grid points comprising at least one of:
a future location of the object,
a velocity of the object when passing through the grid point, or
a yaw of the object when passing through the grid point.

9. The method of claim 5, the method further comprising:
receiving sensor data from a sensor associated with the vehicle in the environment;
determining, based at least in part on the sensor data, data comprising a top-down representation of the environment and the object in the environment;
inputting the data into the first machine learned model; and
receiving, from the first machine learned model, the feature vector associated with the object.

10. The method of claim 5, further comprising:
determining a speed of the object;
comparing, as a comparison, the speed of the object to a speed threshold; and
outputting, based at least in part on the comparison, the grid comprising a grid point representing the candidate location in the environment.

11. The method of claim 5, wherein:
the metadata indicates the attribute of the object over a time period; and
the second machine learned model comprises a multi-layer perceptron.

12. The method of claim 5, wherein the predicted trajectory is a first predicted trajectory, the classification probability is a first classification probability, and the metadata is first metadata, the method further comprising:
determining, by the second machine learned model, a second predicted trajectory, a second classification probability associated with the second predicted trajectory, and second metadata associated with the object; and
determining, based at least in part on the first classification probability and the second classification probability, a rank of the first predicted trajectory relative to the second predicted trajectory;
wherein controlling the vehicle is further based at least in part on the rank.

13. The method of claim 5, further comprising:
determining that the object is associated with a location in the environment off of a roadway;
outputting the multiple grid points to represent potential future positions of the object; and
determining the predicted trajectory based at least in part on the multiple grid points.

14. The method of claim 5, further comprising:
determining a plurality of candidate trajectories; and
determining the predicted trajectory associated with the object based at least in part on non-maximal suppression of the plurality of candidate trajectories.

15. The method of claim 5, wherein the multiple grid points indicate a shape, a boundary, or an orientation of the object.

16. One or more non-transitory computer-readable media storing instructions that, when executed, cause one or more processors to perform actions comprising:
receiving, as input into a first machine learned model, polylines representing an object or feature of an environment;
aggregating, by the first machine learned model, the polylines into a node data structure; and
outputting, by the first machine learned model and based at least in part on the node data structure, a feature vector;
receiving the feature vector associated with the object and the environment of a vehicle;
determining a candidate location of the object in the environment based at least in part on dynamics of the vehicle and a grid comprising a plurality of grid points indicating candidate locations for the object, wherein the object overlaps multiple grid points of the plurality of grid points;
inputting, to a second machine learned model, the feature vector and the candidate location of the object in the environment;
receiving, from the second machine learned model, a predicted trajectory associated with the object, a classification probability associated with the predicted trajectory, and metadata indicating an attribute of the object; and
controlling the vehicle based at least in part on the metadata indicating the attribute of the object.

17. The one or more non-transitory computer-readable media of claim 16, the actions further comprising:
determining, by the first machine learned model, a first vectorized representation comprising a top-down representation of the environment and the object in the environment;
determining, by the first machine learned model, a second vectorized representation comprising one or more of: position data, orientation data, heading data, velocity data, speed data, acceleration data, yaw rate data, or turning rate data associated with the object; and determining the feature vector based at least in part on the first vector representation and the second vector representation.

18. The one or more non-transitory computer-readable media of claim 17, the actions further comprising:
   determining an object type associated with the object;
   determining, based at least in part on the object type, a grid location relative to the object;
   outputting the grid at the grid location; and
   determining the predicted trajectory associated with the object based at least in part on the grid.

19. The one or more non-transitory computer-readable media of claim 18, wherein
   a grid point of the plurality of grid points comprising at least one of:
   a future location of the object,
   a velocity of the object when passing through the grid point, or
   a yaw of the object when passing through the grid point.

20. The one or more non-transitory computer-readable media of claim 18, the actions further comprising:
   determining a speed of the object;
   comparing, as a comparison, the speed of the object to a speed threshold; and
   outputting, based at least in part on the comparison, the grid comprising a grid point representing the candidate location in the environment.

* * * * *